US008907193B2

(12) United States Patent
Cross et al.

(10) Patent No.: US 8,907,193 B2
(45) Date of Patent: Dec. 9, 2014

(54) INSTRUMENT GAME SYSTEM AND METHOD

(75) Inventors: Paul Cross, San Francisco, CA (US); Nicholas Bonardi, San Francisco, CA (US); Naomi Higo, San Francisco, CA (US)

(73) Assignee: Ubisoft Entertainment, Rennes (FR)

( * ) Notice: Subject to any disclaimer, the term of this patent is extended or adjusted under 35 U.S.C. 154(b) by 145 days.

(21) Appl. No.: 13/047,727

(22) Filed: Mar. 14, 2011

(65) Prior Publication Data

US 2011/0207513 A1 Aug. 25, 2011

Related U.S. Application Data

(63) Continuation-in-part of application No. 11/865,681, filed on Oct. 1, 2007.

(60) Provisional application No. 60/902,066, filed on Feb. 20, 2007.

(51) Int. Cl.
*G04B 13/00* (2006.01)
*A63F 13/40* (2014.01)
*G10H 1/36* (2006.01)

(52) U.S. Cl.
CPC ............... *A63F 13/10* (2013.01); *G10H 1/368* (2013.01); *A63F 2300/1062* (2013.01); *A63F 2300/6027* (2013.01); *A63F 2300/61* (2013.01); *A63F 2300/638* (2013.01); *A63F 2300/8047* (2013.01); *G10H 2210/091* (2013.01); *G10H 2220/015* (2013.01); *G10H 2220/151* (2013.01)
USPC ............... 84/609; 84/613; 84/649; 84/650; 84/470 R; 84/477 R; 84/483.2; 84/485 R

(58) Field of Classification Search
CPC .............. G10H 2210/091; G10H 2220/015; G10H 2220/151; G10H 2220/051; G10H 2220/036; G10H 2210/335; G10H 2220/076; G10G 1/02
See application file for complete search history.

(56) References Cited

U.S. PATENT DOCUMENTS

| 4,264,845 A | 4/1981 | Bednarz |
| 4,318,327 A | 3/1982 | Toups |
| 4,919,030 A | 4/1990 | Perron, III |

(Continued)

FOREIGN PATENT DOCUMENTS

| EP | 1465150 | 6/2004 |
| WO | WO 98/58364 | 12/1998 |

(Continued)

OTHER PUBLICATIONS

PCT International Search Report of PCT/US12/29123; dated Jun. 20, 2012 (2 pages).

(Continued)

*Primary Examiner* — Marlon Fletcher
(74) *Attorney, Agent, or Firm* — Erise IP, P.A.

(57) ABSTRACT

A game system and method that uses an instrument as an input encourages a user to play along with the game's soundtrack on an instrument (e.g. guitar, bass, etc.). The game cues the player to play notes and/or chords on the instrument at an appropriate time and then data is collected from the instrument via a connection between the instrument and the apparatus running the game. The game then scores the user based on note/chord and timing information it receives.

20 Claims, 40 Drawing Sheets

(56) References Cited

U.S. PATENT DOCUMENTS

| | | | |
|---|---|---|---|
| 5,036,742 A | 8/1991 | Youakim | |
| 5,214,231 A | 5/1993 | Ernst et al. | |
| 5,270,475 A | 12/1993 | Weiss et al. | |
| 5,408,911 A | 4/1995 | Weiss et al. | |
| 5,533,903 A | 7/1996 | Kennedy | |
| 5,583,308 A | 12/1996 | Owen | |
| 5,585,583 A | 12/1996 | Owen | |
| 5,627,335 A | 5/1997 | Rigopulos et al. | |
| 5,690,496 A | 11/1997 | Kennedy | |
| 5,763,804 A | 6/1998 | Rigopulos et al. | |
| D398,595 S | 9/1998 | Baer et al. | |
| 5,834,671 A | 11/1998 | Phoenix | |
| 5,990,405 A | 11/1999 | Auten et al. | |
| 6,011,212 A | 1/2000 | Rigopulos et al. | |
| 6,066,791 A | 5/2000 | Renard et al. | |
| 6,156,965 A | 12/2000 | Shinsky | |
| 6,211,451 B1 | 4/2001 | Tohgi et al. | |
| 6,225,547 B1 | 5/2001 | Toyama et al. | |
| 6,268,557 B1 | 7/2001 | Devecka et al. | |
| 6,336,092 B1 | 1/2002 | Gibson et al. | |
| 6,347,998 B1 | 2/2002 | Yoshitomi et al. | |
| 6,353,169 B1 | 3/2002 | Juszkiewicz et al. | |
| 6,353,174 B1 | 3/2002 | Schmidt et al. | |
| 6,390,923 B1 | 5/2002 | Yoshitomi et al. | |
| 6,410,835 B2 | 6/2002 | Suzuki et al. | |
| 6,425,822 B1 | 7/2002 | Hayashida et al. | |
| 6,425,827 B1 | 7/2002 | Nimura | |
| 6,429,863 B1 | 8/2002 | LoPiccolo et al. | |
| 6,476,304 B2 | 11/2002 | Uehara | |
| 6,482,087 B1 | 11/2002 | Egozy et al. | |
| 6,486,388 B2 | 11/2002 | Akahori | |
| 6,495,747 B2 | 12/2002 | Shimaya et al. | |
| 6,515,211 B2 | 2/2003 | Umezawa et al. | |
| 6,541,692 B2 | 4/2003 | Miller | |
| 6,605,769 B1 | 8/2003 | Juszkiewicz | |
| 6,628,313 B1 | 9/2003 | Minakuchi et al. | |
| 6,645,067 B1 | 11/2003 | Okita et al. | |
| 6,686,531 B1 | 2/2004 | Pennock et al. | |
| 6,740,803 B2 | 5/2004 | Brinkman et al. | |
| 6,751,439 B2 | 6/2004 | Tice et al. | |
| 6,835,887 B2 | 12/2004 | Devecka | |
| 6,850,252 B1 | 2/2005 | Hoffberg | |
| 6,870,085 B2 | 3/2005 | MacCutcheon | |
| 6,969,797 B2 | 11/2005 | Brinkman et al. | |
| 6,974,325 B2 | 12/2005 | D'Zmura | |
| 7,019,205 B1 | 3/2006 | Fujisawa et al. | |
| 7,020,635 B2 | 3/2006 | Hamilton et al. | |
| 7,030,307 B2 | 4/2006 | Wedel | |
| 7,030,311 B2 | 4/2006 | Brinkman et al. | |
| 7,034,217 B2 * | 4/2006 | Pachet | 84/609 |
| 7,081,580 B2 | 7/2006 | Brinkman et al. | |
| 7,103,873 B2 | 9/2006 | Tanner et al. | |
| 7,129,407 B2 | 10/2006 | Hiratsuka et al. | |
| 7,151,214 B2 | 12/2006 | Barry | |
| 7,157,638 B1 | 1/2007 | Sitrick | |
| 7,164,076 B2 | 1/2007 | McHale et al. | |
| 7,174,510 B2 | 2/2007 | Salter | |
| 7,288,712 B2 | 10/2007 | Uehara | |
| 7,320,643 B1 | 1/2008 | Brosius et al. | |
| 7,335,833 B2 | 2/2008 | Smith et al. | |
| D573,605 S | 7/2008 | Amacker | |
| 7,404,202 B2 | 7/2008 | Hamilton et al. | |
| 7,423,214 B2 | 9/2008 | Reynolds et al. | |
| 7,435,178 B1 | 10/2008 | Tam et al. | |
| 7,435,891 B2 * | 10/2008 | Perla | 84/470 R |
| 7,439,441 B2 | 10/2008 | Jarrett et al. | |
| 7,446,253 B2 | 11/2008 | Knapp et al. | |
| 7,453,035 B1 | 11/2008 | Evans et al. | |
| 7,459,624 B2 | 12/2008 | Schmidt et al. | |
| 7,472,525 B2 | 1/2009 | Griggs et al. | |
| 7,486,791 B2 | 2/2009 | Ohbi et al. | |
| 7,487,549 B2 | 2/2009 | Kawamoto et al. | |
| 7,521,619 B2 | 4/2009 | Salter | |
| 7,562,312 B2 | 7/2009 | Rochford et al. | |
| 7,663,044 B2 * | 2/2010 | Katsuta | 84/470 R |
| 7,675,514 B2 | 3/2010 | Ni et al. | |
| 7,758,427 B2 | 7/2010 | Egozy | |
| 7,773,121 B1 | 8/2010 | Huntsberger et al. | |
| 7,799,984 B2 | 9/2010 | Salter | |
| 7,806,759 B2 | 10/2010 | McHale et al. | |
| 7,893,337 B2 * | 2/2011 | Lenz | 84/477 R |
| 7,923,620 B2 | 4/2011 | Foster | |
| 7,935,880 B2 | 5/2011 | Stoddard et al. | |
| 7,982,114 B2 | 7/2011 | Applewhite et al. | |
| 8,026,435 B2 | 9/2011 | Stoddard et al. | |
| 8,076,564 B2 | 12/2011 | Applewhite | |
| 8,079,901 B2 | 12/2011 | Brosius et al. | |
| 8,079,907 B2 | 12/2011 | Egozy | |
| 8,119,896 B1 | 2/2012 | Smith | |
| D664,551 S | 7/2012 | Boyer et al. | |
| 8,303,409 B2 * | 11/2012 | Tsubakisawa et al. | 463/31 |
| 8,481,838 B1 | 7/2013 | Smith | |
| 8,586,849 B1 | 11/2013 | Smith | |
| 8,686,269 B2 * | 4/2014 | Schmidt et al. | 84/477 R |
| 8,690,670 B2 * | 4/2014 | Kay et al. | 463/31 |
| 2001/0035088 A1 | 11/2001 | Faecher | |
| 2001/0039870 A1 | 11/2001 | Shimaya et al. | |
| 2001/0040671 A1 | 11/2001 | Metcalf | |
| 2001/0045153 A1 | 11/2001 | Alexander et al. | |
| 2002/0004191 A1 | 1/2002 | Tice et al. | |
| 2002/0157521 A1 | 10/2002 | Shahal | |
| 2002/0194984 A1 * | 12/2002 | Pachet | 84/609 |
| 2003/0066414 A1 | 4/2003 | Jameson | |
| 2003/0096556 A1 | 5/2003 | Fong | |
| 2003/0151628 A1 | 8/2003 | Salter | |
| 2004/0055441 A1 | 3/2004 | Katsuta | |
| 2004/0123726 A1 * | 7/2004 | Kato et al. | 84/609 |
| 2004/0158462 A1 | 8/2004 | Rutledge et al. | |
| 2004/0192430 A1 | 9/2004 | Burak et al. | |
| 2004/0233239 A1 | 11/2004 | Lahdesmaki | |
| 2004/0255758 A1 | 12/2004 | Klefenz et al. | |
| 2005/0034591 A1 | 2/2005 | Chang | |
| 2005/0235812 A1 | 10/2005 | Fallgatter | |
| 2005/0252362 A1 * | 11/2005 | McHale et al. | 84/616 |
| 2005/0255914 A1 * | 11/2005 | McHale et al. | 463/31 |
| 2006/0020469 A1 | 1/2006 | Rast | |
| 2006/0050901 A1 | 3/2006 | Cohen et al. | |
| 2006/0107819 A1 | 5/2006 | Salter | |
| 2006/0107826 A1 | 5/2006 | Knapp et al. | |
| 2006/0151803 A1 | 7/2006 | Wesner et al. | |
| 2006/0196343 A1 | 9/2006 | Yung | |
| 2006/0236850 A1 | 10/2006 | Shaffer | |
| 2006/0245599 A1 | 11/2006 | Regnier | |
| 2007/0000375 A1 | 1/2007 | Harrison, Jr. | |
| 2007/0003073 A1 | 1/2007 | Iriarte | |
| 2007/0044638 A1 | 3/2007 | Egan | |
| 2007/0051226 A1 | 3/2007 | Diaz | |
| 2007/0066403 A1 | 3/2007 | Conkwright | |
| 2007/0163427 A1 | 7/2007 | Rigopulos et al. | |
| 2007/0232374 A1 * | 10/2007 | Lopiccolo et al. | 463/7 |
| 2007/0234885 A1 * | 10/2007 | Schmidt et al. | 84/722 |
| 2007/0245881 A1 | 10/2007 | Egozy et al. | |
| 2007/0256540 A1 | 11/2007 | Salter | |
| 2007/0256541 A1 | 11/2007 | McCauley | |
| 2007/0256543 A1 | 11/2007 | Evans et al. | |
| 2007/0256551 A1 | 11/2007 | Knapp et al. | |
| 2008/0078281 A1 | 4/2008 | Katsuta | |
| 2008/0113797 A1 | 5/2008 | Egozy | |
| 2008/0122922 A1 | 5/2008 | Geng | |
| 2008/0173162 A1 | 7/2008 | Williams | |
| 2008/0200224 A1 | 8/2008 | Parks | |
| 2008/0205669 A1 | 8/2008 | Michelet | |
| 2008/0318673 A1 | 12/2008 | Rofougaran | |
| 2009/0038467 A1 * | 2/2009 | Brennan | 84/609 |
| 2009/0064851 A1 | 3/2009 | Morris et al. | |
| 2009/0098918 A1 | 4/2009 | Teasdale et al. | |
| 2009/0100988 A1 | 4/2009 | Villa et al. | |
| 2009/0100991 A1 | 4/2009 | Lazovic | |
| 2009/0104956 A1 | 4/2009 | Kay et al. | |
| 2009/0191932 A1 | 7/2009 | Chiu et al. | |
| 2010/0009755 A1 | 1/2010 | Burckart et al. | |
| 2010/0016079 A1 | 1/2010 | Jessop | |
| 2010/0087254 A1 | 4/2010 | Sullivan | |
| 2010/0137048 A1 | 6/2010 | Kim et al. | |

(56) References Cited

U.S. PATENT DOCUMENTS

| | | | |
|---|---|---|---|
| 2010/0137049 A1 | 6/2010 | Epstein | |
| 2010/0216549 A1* | 8/2010 | Salter | 463/31 |
| 2010/0313736 A1* | 12/2010 | Lenz | 84/477 R |
| 2011/0003638 A1 | 1/2011 | Lee et al. | |
| 2011/0028218 A1 | 2/2011 | Gomes et al. | |
| 2011/0203442 A1* | 8/2011 | Raveendran | 84/483.1 |
| 2011/0207513 A1 | 8/2011 | Cross et al. | |
| 2011/0247479 A1* | 10/2011 | Helms et al. | 84/613 |
| 2011/0259176 A1* | 10/2011 | Pillhofer et al. | 84/470 R |
| 2012/0090446 A1* | 4/2012 | Moreno | 84/470 R |
| 2012/0266738 A1* | 10/2012 | Evans et al. | 84/609 |
| 2013/0036897 A1 | 2/2013 | Parks | |
| 2013/0065656 A1 | 3/2013 | Parks | |
| 2014/0109750 A1* | 4/2014 | Reynolds et al. | 84/612 |

FOREIGN PATENT DOCUMENTS

| | | |
|---|---|---|
| WO | WO 01/95052 | 12/2001 |
| WO | WO 2006/042358 | 4/2006 |
| WO | 2008/103269 A1 | 8/2008 |
| WO | 2012/125763 A2 | 9/2012 |

OTHER PUBLICATIONS

PCT Written Opinion of PCT/US12/29123; dated Jun. 20, 2012 (5 pages).
Cakewalk © Pro Audio™ User's Guide Copyright © 1999 (604 pages).
Webpage:http://web.archive.org/web/20070920223307/http://www.seventhstring.com/tuner/tuner.html, dated Sep. 20, 2007 (5 pages).
Webpage: http://web.archive.org/web/2007071209222/http://www.nch.com.au/twelvekeys, dated Jul. 12, 2007 (1 page).
Webpage:http://web.archive.org/web/20080309172950/http://www.owlnet.rice.edu/~elec301/Projects02/realTime/TheProgram.htm, dated Mar. 9, 2008 (1 page).
Webpage: http://marketplace.xbox.com/en-US/Product/Karaoke-Revolution/66acd000-77fe-1000-9115-d8024b4e0803, dated Aug. 27, 2012 (3 pages).
Webpage: http://web.archive.org/20070705093418/http://en.wikipedia.org/wiki/Karaoke_Revolution, dated Jul. 5, 2007 (4 pages).
Webpage: http://web.archive.org/web/20070929061546/http://www.noteworthysoftware.com, dated Sep. 29, 2007 (2 pages).
Webpage: http://web.archive.org/web/20070218101428/http://www.sloud.com/technology/query_by_humming, dated Sep. 27, 2007 (2 pages).
Webpage: http://web.archive.org/web/20070928013629/http:/www.ultrastarstuff.com/ dated Sep. 27, 2007 (2 pages).
Webpage: http://web.archive.org/web/20070809101756/http://www.starplaymusic.com/index.php, dated Aug. 9, 2007 (2 pages).
PCT/US 08/01965 International Preliminary Report dated Sep. 3, 2009 (2 pgs).
PCT/US 08/01965, Written Opinion, Aug. 1, 2008 (5 pgs).
PCT/US 08/01965, International Search Report, Jun. 9, 2008 (3 pgs).
PCT/US 08/01965, Written Opinion, Jun. 9, 2008 (6 pgs).
Miracle Piano Teaching System, from Wikipedia, 1990; http://en.wikipedia.org/wiki/Miracle_Piano (2 pgs).
Miracle Piano Teaching System, Nintendo Entertainment System User's Guide, 1990; 1991 The Software Toolworks, Inc.; (34 pgs).
Teach Me Piano (formerly Discovering Keyboards), Voyetra Technologies, 1997 (copyright 1996) (2 pgs).
Karaoke, Revolution, Konami, Nov. 2003 (6 pgs).
International Search Report dated Jul. 8, 2010 for PCT application PCT/US2009/065413.
Greg Johnson. www.littleBigStar.net. Games with music instruments/make music by gaming. 2007. Accessed Jul. 5, 2010.
JamOrigin. www.jamorigin.com. Amazing Guitar Recognition Engine. 2010. Accessed Jul. 5, 2010.
Offbeat-Guitarist-The Guide. http://offbeatforum.com/entry.php?2-OFFBEAT-Guitarist-The-Guide.com. 2010. Accessed Jul. 5, 2010.
DJ Hero 101. www.djhero.com. Available at http://www.djhero.com/game/djhero101. Accessed Feb. 3, 2010.
DJ Hero. Wikipedia. Available at http://en.wikipedia.org/wiki/Dj_hero. Accessed Feb. 3, 2010.
Guitar Hero. Wikipedia. Available at http://en.wikipedia.org/wiki/Guitar_Hero. Accessed Feb. 3, 2010.
U.S. Appl. No. 60/902,066 entitled Music video game with stringed instrument input filed: Feb. 20, 2007.

* cited by examiner

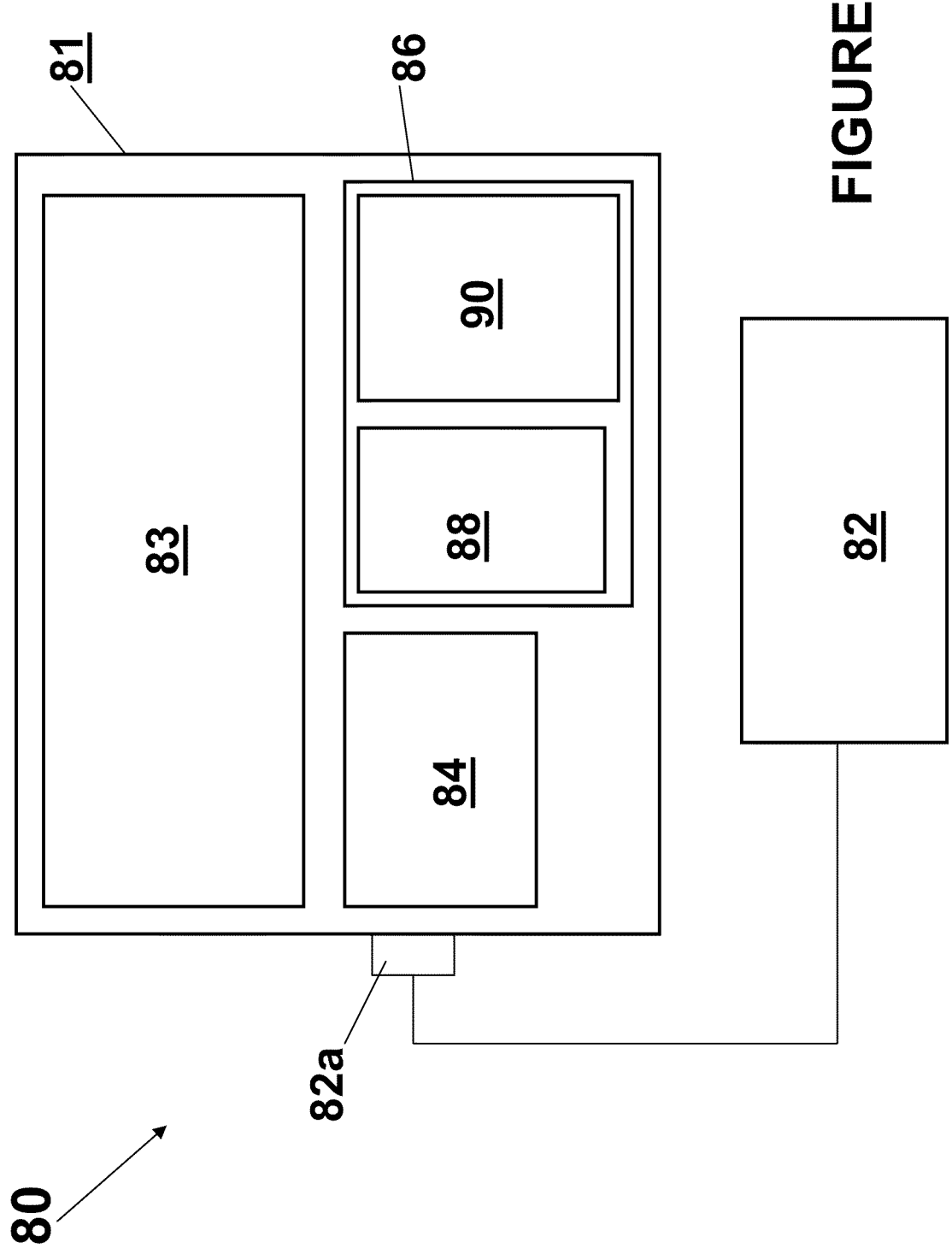

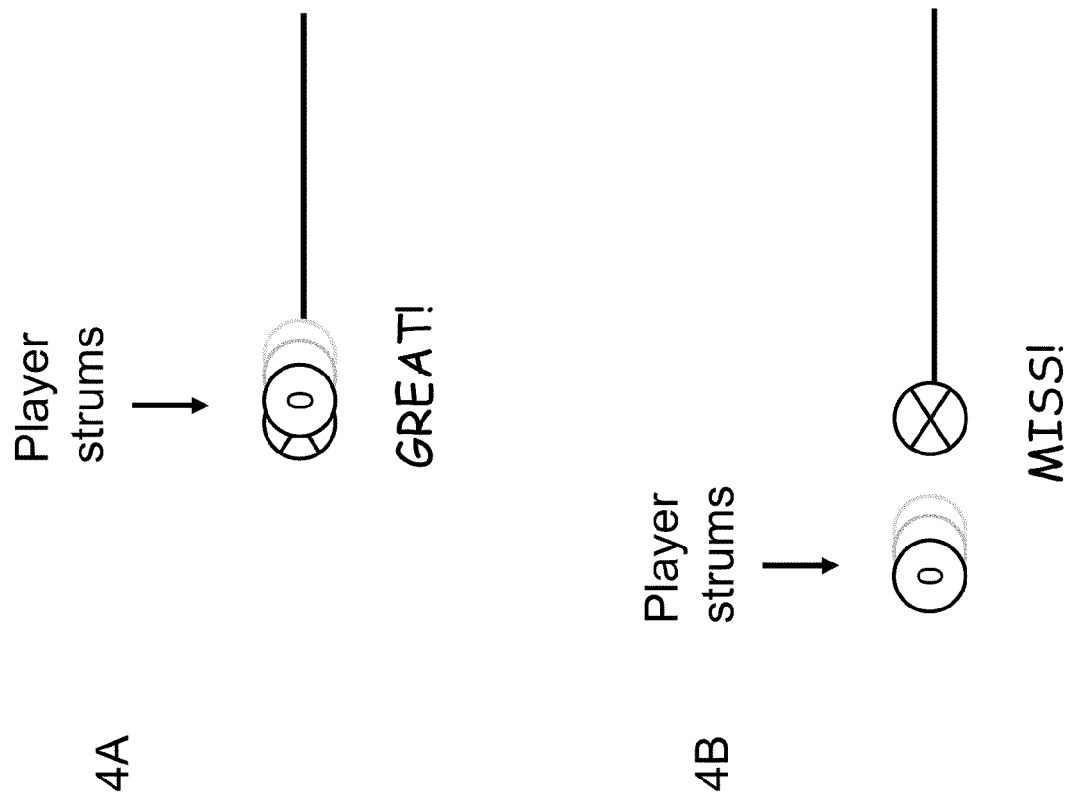

Figure 20  Select Music

Figure 21
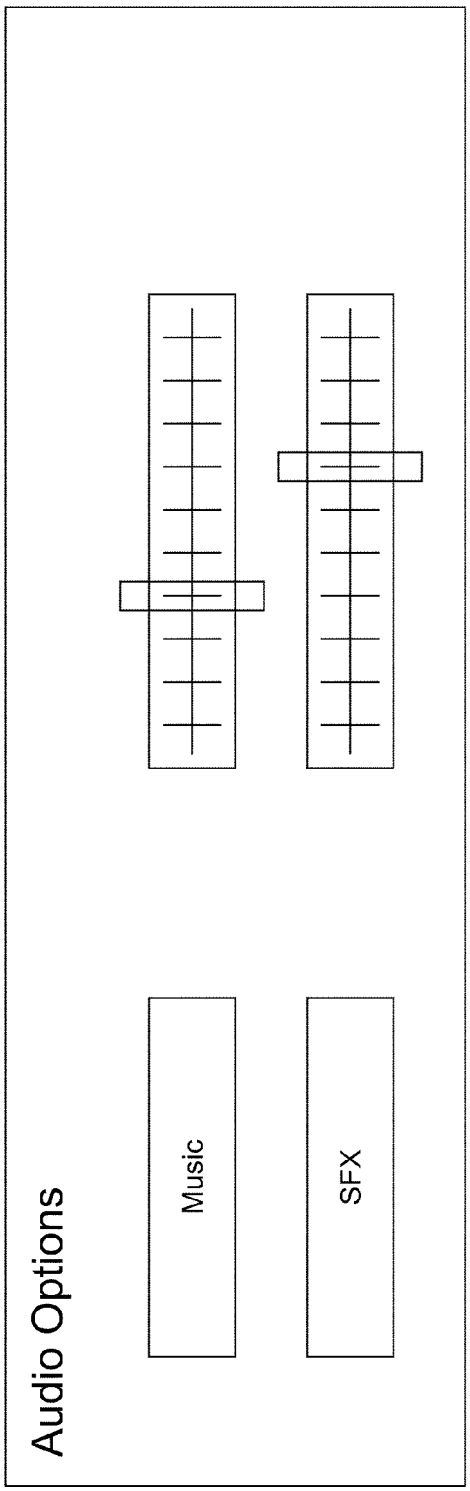
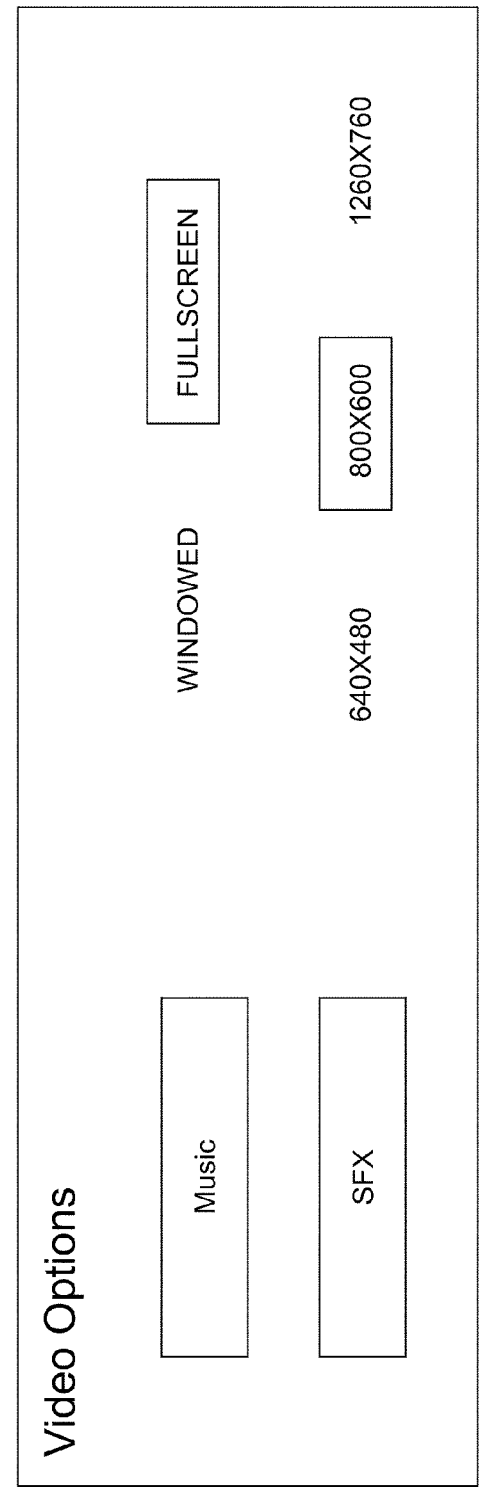

| Level | Min # of Repetitions | Max # of Repetitions | Example Player |
|---|---|---|---|
| 0 | 0 | 4 | 0 |
| 1 | 0 | 4 | 1 |
| 2 | 0 | 4 | 1 |
| 3 | 1 | 4 | 1 |
| 4 | 1 | 4 | 2 |
| 5 | 1 | 6 | 2 |
| 6 | 1 | 6 | 3 |
| etc... | | | 4 |

Figure 32

Key
LUM = Level Up Multiplier (-0.5)
LDM = Level Down Multiplier (0.5)
Total Level Up = Total number of times that level has been leveled up.
Total Level Down = Total number of times that level has been leveled down.

| Level | # of Reps | Total level up | Total level down | Results |
|---|---|---|---|---|
| 0 | 2 | - | - | 1 |
| 1 | 2 | - | - | 1 |
| 2 | 2 | 2 | - | 1 |
| 3 | 2 | - | - | 2 |
| 4 | 2 | - | - | 2 |
| 5 | 2 | - | - | 2 |
| 6 | 2 | - | - | 2 |
| etc... | | | | ... |

Figure 34A

| Level | # of Reps | Total level up | Total level down | Results |
|---|---|---|---|---|
| 0 | 2 | - | - | 2 |
| 1 | 2 | - | - | 2 |
| 2 | 2 | - | - | 2 |
| 3 | 2 | - | - | 2 |
| 4 | 2 | - | 1 | 2.5 |
| 5 | 2 | - | - | 2.5 |
| 6 | 2 | - | - | 2.5 |
| etc... | | | | ... |

Figure 34B

| Level | # of Reps | Total level up | Total level down | Results |
|---|---|---|---|---|
| 0 | 2 | 2 | - | 0 |
| 1 | 2 | 2 | - | 0 |
| 2 | 2 | 2 | - | 0.5 |
| 3 | 2 | 1 | - | 1.5 |
| 4 | 2 | - | 1 | 2.5 |
| 5 | 2 | - | 2 | 3.5 |
| 6 | 2 | - | - | 3.5 |
| etc... | | | | ... |

Figure 34C

INSTRUMENT GAME SYSTEM AND METHOD

PRIORITY CLAIM

This application is claims priority under 35 USC 120 and is a continuation in part of U.S. patent application Ser. No. 11/865,681, filed on Oct. 1, 2007 with the title "Instrument Game System and Method" that in turn claims priority under 35 USC 119(e) and 120 to U.S. Provisional Patent Application Ser. No. 60/902,066 filed on Feb. 20, 2007 entitled "A Music Music Video Game with Stringed Instrument Input" which is incorporated herein by reference.

APPENDIX A

Appendix A (8 pages) is an example of the source code that implements the adaptive adjustment process described herein and Appendix A forms part of the specification.

FIELD

A system and method for game playing is described. In more detail, a system and method for using an instrument as an input to a game and the game with the instrument input is disclosed.

BACKGROUND

Video games generally are well known. In addition, video games and gaming system with music type games are also known. The game systems may be both personal computer/gaming console (Microsoft® Xbox® or Sony® Play Station2®) or stand-alone gaming consoles such as might be in an arcade. Examples of these types of games include Dance, Dance Revolution in which a user attempts to follow a dance routine set to music and is scored based on the accuracy of the user's dance routine to the exemplary dance routine and Guitar Hero in which the user has a controller (that looks like a guitar), plays along with a song and is scored based on how closely the user can play the song as compared to the exemplary song. It is desirable to provide a game system and method in which an instrument is the input controller to the game system and it is to this end that the present invention is directed.

BRIEF DESCRIPTION OF THE DRAWINGS

FIG. 1A illustrates an example of an implementation of a game system;

FIGS. 4A and 4B illustrate an example of a hit event and a miss event of the stringed instrument example of the game system;

FIGS. 21A and 21B illustrate an audio and video selection user interface of the game system;

FIG. 32 illustrates a persistent dynamic difficulty table that is part of the adaptive adjustment process;

FIGS. 34A-C illustrate examples of a level up action result on a dynamic difficulty table, a level down action result on the dynamic difficulty table and a dynamic difficulty table at the end of a song, respectively;

DETAILED DESCRIPTION OF ONE OR MORE EMBODIMENTS

The game system and method are particularly applicable to a personal computer based, guitar based game system and method with the exemplary user interface described below and it is in this context that the system and method will be described. It will be appreciated, however, that the system and method has greater utility because: 1) the game system can be implemented with other musical or melodic instruments, such as any melodic instrument including, for example, a bass, violin, banjo, piano, voice, clarinet, steel drums, etc.; 2) it can be implemented on other gaming apparatus, such as gaming consoles or stand-alone gaming units (such as the Microsoft® Xbox® system, the Sony® PlayStation®, Nintendo® Wii, etc.); 3) it can be implemented in peer-to-peer, ASP model, client/server architectures or as an Internet game; and 4) it can be implemented using other user interfaces and features that are not specifically described below in the exemplary embodiments which are provided to illustrate the game system and method. Now, an example of an implementation of the game system to illustrate the functions and principles is described in more detail.

Figure 1B:
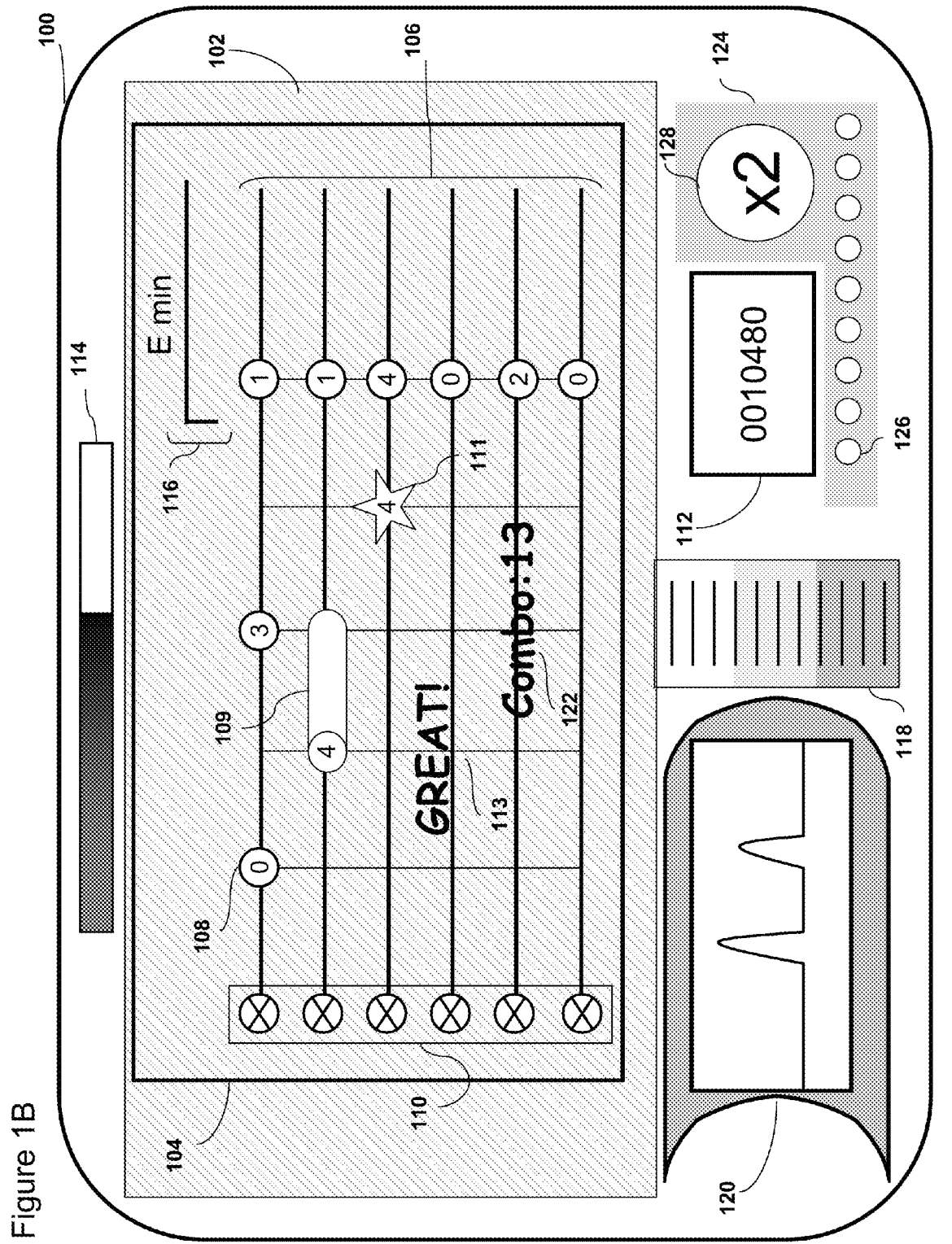
FIG. 1B illustrates an example of a user interface of a stringed instrument example of the game system.

FIG. 1A illustrates an example of an implementation of a game system 80 where the game system is implemented as a software based stand-alone system. The system 80 may include a game unit 81, such as a cabinet or stand-alone unit, and an instrument 82, such as any musical or melodic instruments including, for example, a bass, violin, banjo, piano, voice, clarinet, steel drums, etc., that is used as an input to the game unit 81 via an interface 82a such as a USB cable, amplifier cord with adapter for computer sound card, networking cable carrying musical data information, a microphone, etc. The game unit may include a display 83 that is capable of displaying the user interface of the game to the user (an example of which is described below in more detail with reference to FIG. 1B), one or more processing units 84, a storage unit 86 (that may be a combination of a persistent storage device such as a hard disk drive, ROM, etc.), and a memory such as SRAM or DRAM, and an operating system 88 that controls the operation of the game system and a game module 90 that reside in the storage unit. The game module, in this embodiment, may be a plurality of lines of computer code. In other embodiments, the game module may also be implemented in hardware or a combination of hardware and software. The game module may include modules for game administration (level difficulty functions), musical instrument interface and game scoring. When the game system is active, the game module is loaded into the memory and then executed by the one or more processing units to implement the functions and operations of the game system described in more detail below. The game system permits a user to play an instrument along with an arrangement displayed on the display (use the instrument as an input to the game system using the interface) and then scores the user based on the accuracy with which the user plays the arrangement shown on the display as described in more detail below.

Figure 2:
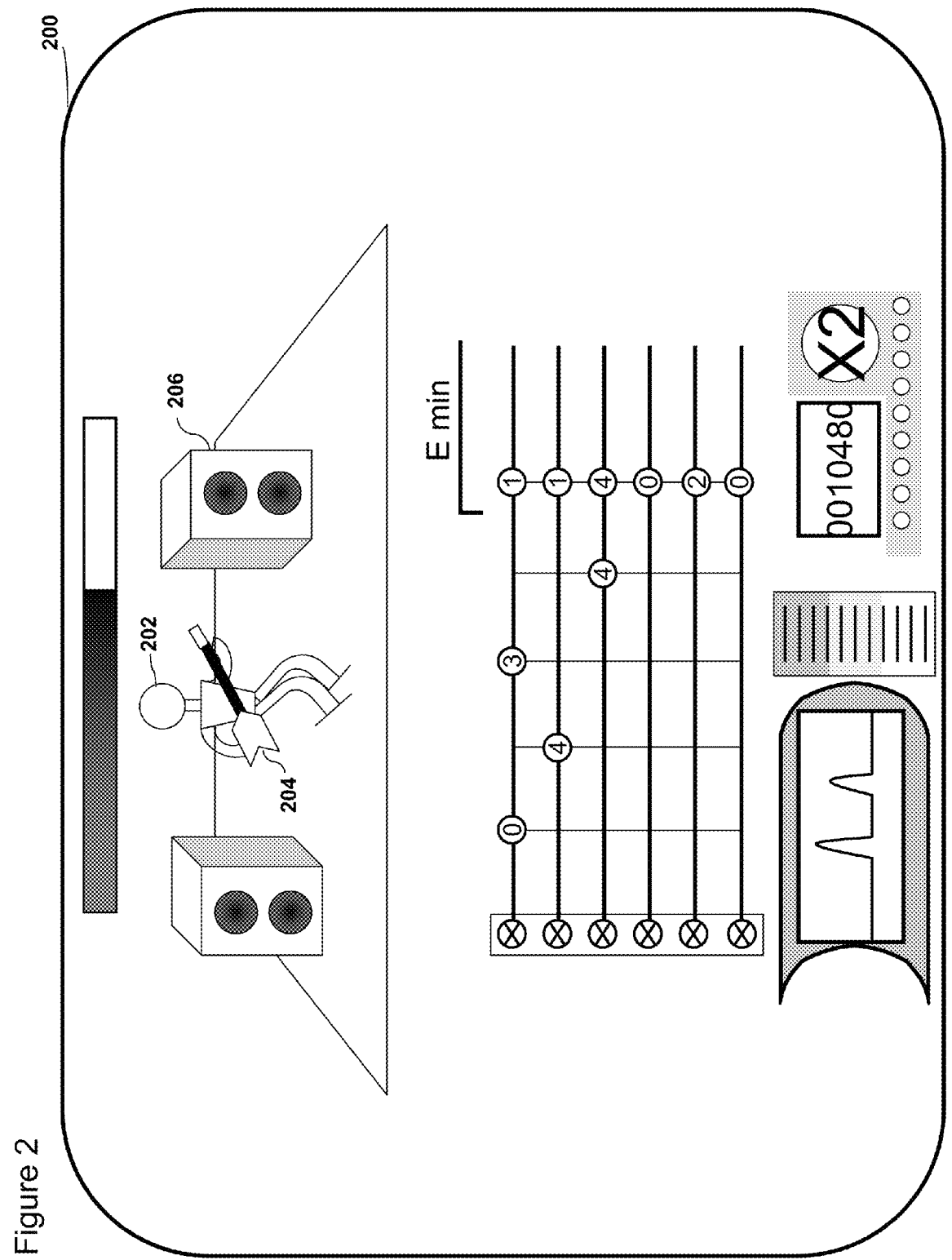
FIG. 2 illustrates an example of a user interface of a stringed instrument example of the game system.

FIG. 1B illustrates an example of a user interface 100 of a stringed instrument example of the game system. The example of the user interface is for illustration purposes only and the game system may use other user interfaces and the game system is not limited to any particular user interface design. The example user interface may include a background graphics 102 that may consist of a number of images or a virtual environment and may be two dimensional or three dimensional. An example of a two dimensional background graphic with a single image (i.e. wallpaper) or a series of images (i.e. a movie, animation, music video, etc.) is shown in FIG. 1B. FIG. 2 shows another embodiment of a user interface 200 that is three dimensional and may include an animated character or characters 202 possibly playing a virtual instrument 204 and surrounded by virtual props 206 (audio equipment, stage, audience, etc.).

Figure 3:
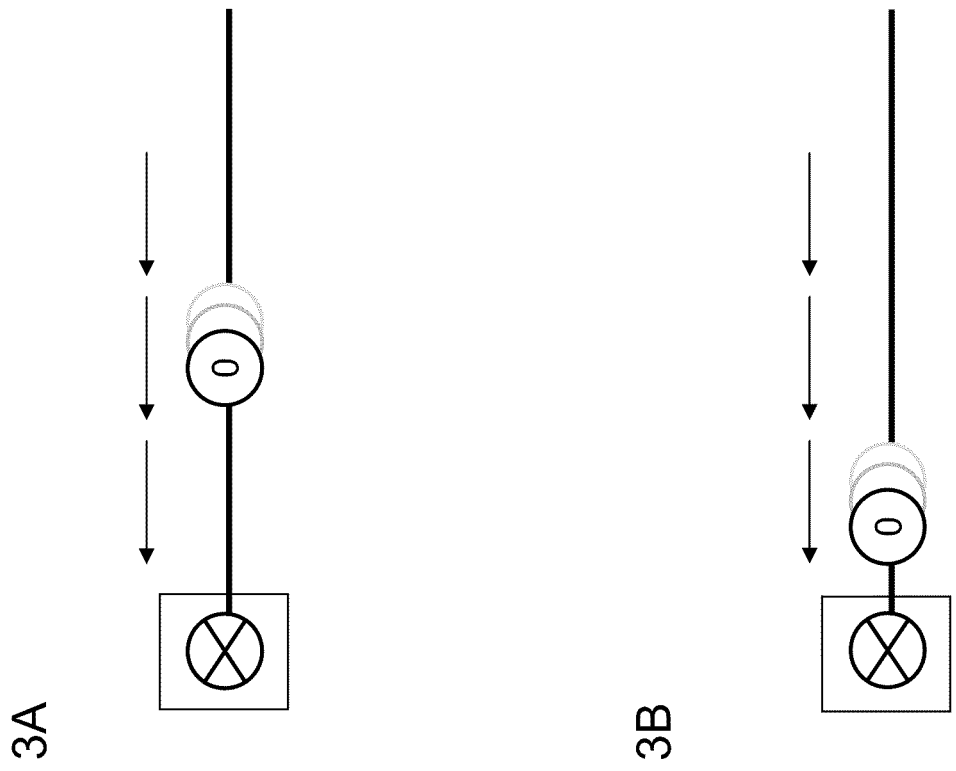
FIGS. 3A and 3B illustrate examples of the user interface of a note moving toward the play area of the stringed instrument example of the game system.
FIG. 3C illustrates another example of the user interface of FIG. 1B.

Returning to FIG. 1B, the exemplary user interface may further include an action indicator interface 104 that may include a note field 106, one or more notes 108 superimposed on top of the note field 106 and a play area 110. In one embodiment of the game system, the horizontal position of a note in the action indicator interface 104 indicates the time to play the note (cue time), the vertical position of the note indicates the string to play it on (cue string), and the number inside each note indicates the fret that is to be pressed down (cue fret) on the string to generate the correct pitch. In the one embodiment, the one or more notes 108 move horizontally towards the play area 110 and the play area 110 is stationary. FIGS. 3A and 3B show this horizontal motion of the notes relative to the play area 110 with FIG. 3A is at an earlier time than FIG. 3B. In the game system, the action indicator interface 104 cues the user to play the appropriate note at a specific time. When the overlap of the note and the play area occur, the user is to play the appropriate note.

Figure 3C:
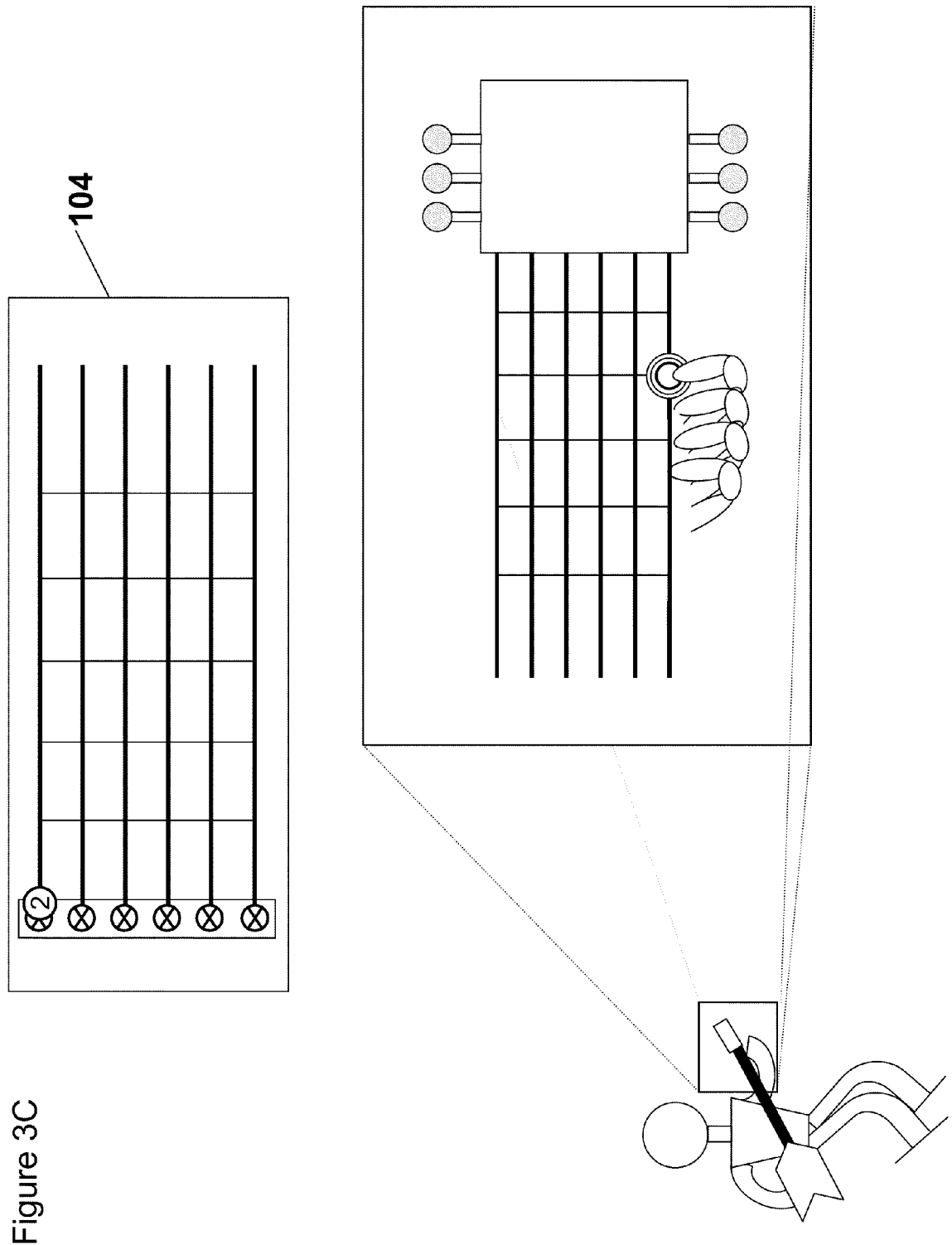

FIG. 3C illustrates the expected user response to the action indicator interface 104. The top row of the user interface corresponds to the user playing the bottom string on a guitar (cue string). The number inside the note corresponds to the user holding down a particular fret of a guitar, such as the $2^{nd}$ fret, with his/her finger (cue fret). The overlap of the note with the play area indicate that the user should play the cue string with the cued fret pressed at that instance (cue time), therefore producing a note that would match the arrangement note if played correctly and played at the correct time.

If the user plays the cued note at the cued time, a "Hit" is awarded. If the user does not play the cued note, or waits too long to play the cued note, a "Miss" is awarded. FIGS. 4A and 4B shows a hit event (when the user plays the correct note at the correct time) and a miss event (when the user fails to play the correct note at the correct time), respectively. In some embodiments of the game system, if the note is judged as a "Hit", the note graphical symbol may change its appearance (i.e. glow, explode, turn bright color, etc.), otherwise, if the note is judged as a "Miss", the graphical symbol for the notes may change its appearance differently (i.e. fade out, shrink, turn dark color, etc.).

In some embodiments of the game system, the user interface 100 shown in FIG. 1B may show different size and/or length notes 108 wherein the size and/or length of a note shows the player how long to hold the note with note 108 illustrating a "short note" and note 109 illustrating a "long note".

In some embodiments of the game system, a note 111 may take on a special characteristic (i.e. glowing star, blinking, moving in a wavy path) from other notes in the note field 106 and may be "hit" by the user (played correctly) for an additional score or otherwise enhance the player's in-game status. In some embodiments, the judgment of the last played note is displayed on-screen in a textual format 113 for the player to receive immediate feedback of the played note. The judgment 113 may read "Great", "Good", "Fair", "Poor", "Miss", etc.

The action indicator interface 104 of the game system may be modified in various ways in other embodiments of the game system. For example, each note 108 (shown as a circle in the example in FIG. 1B) may use other graphical representation (i.e. squares, stars, arrows, etc.)

Figure 5:
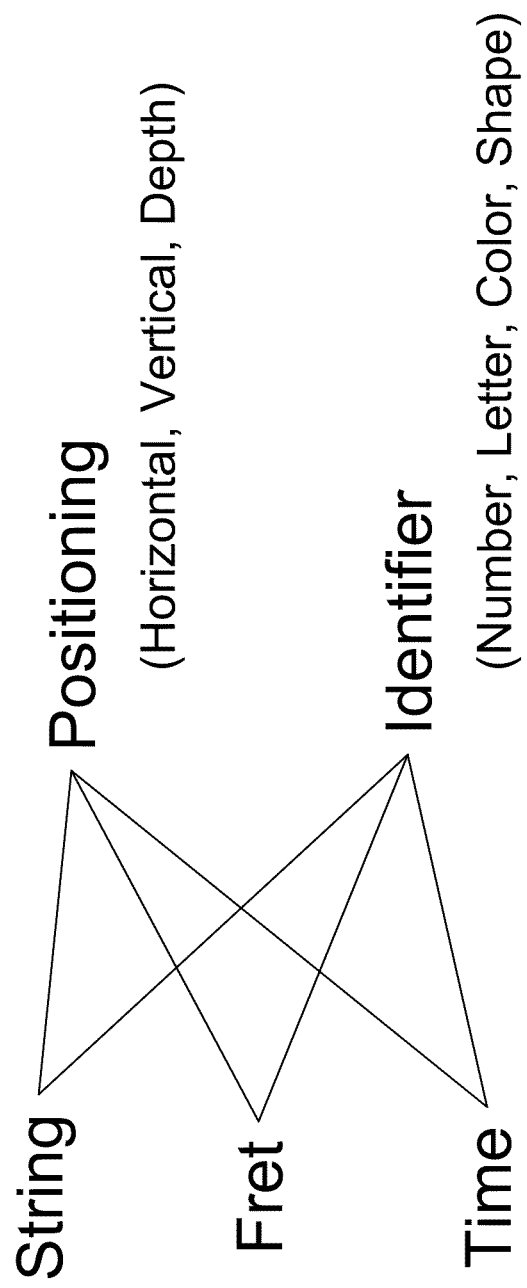
FIG. 5 illustrate an example of the string, fret and time variables of the stringed instrument example of the game system.
Figure 6A:
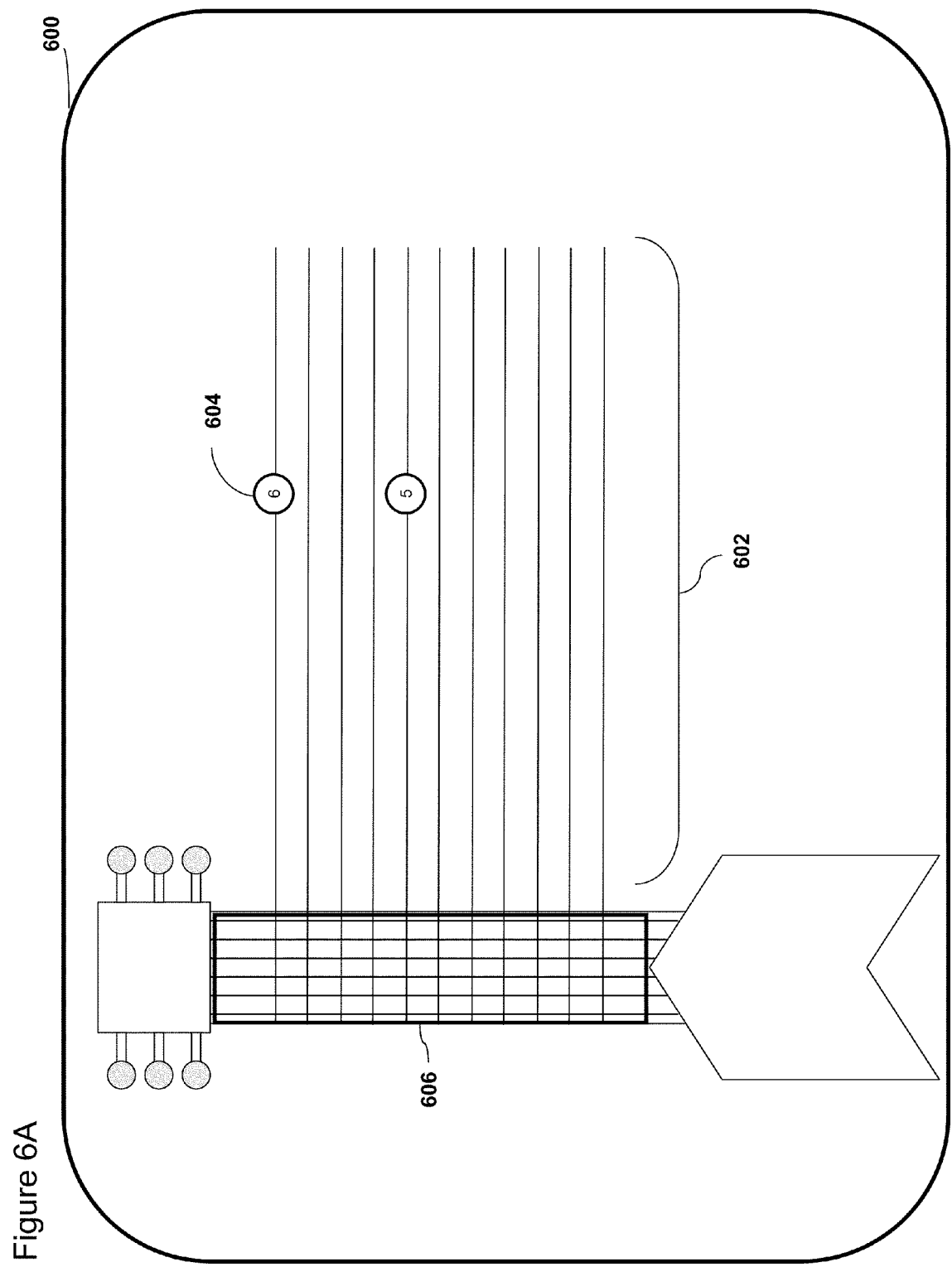
FIG. 6A illustrates an example of an action indicator interface of the stringed instrument example of the game system.
Figure 7:
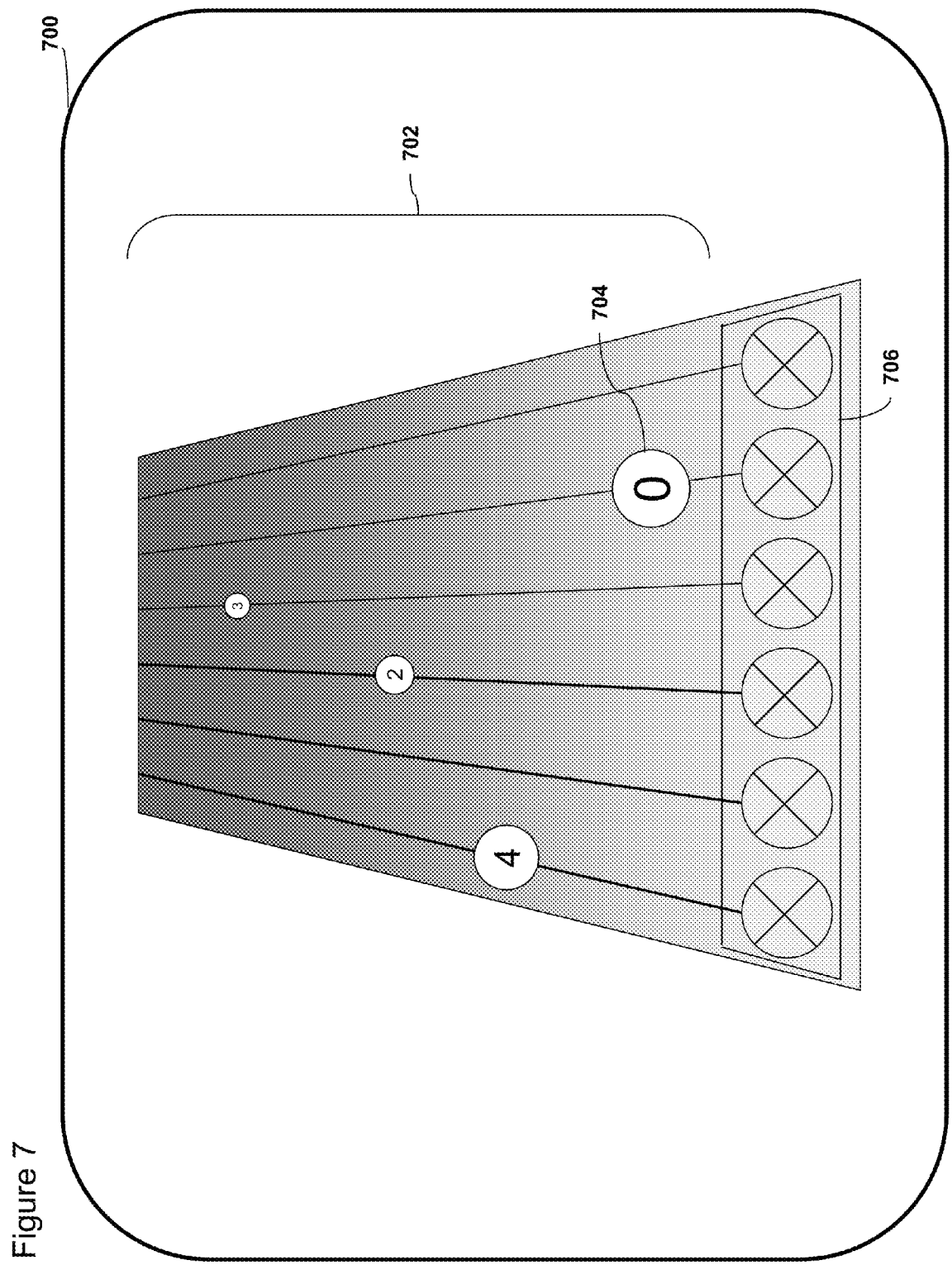
FIG. 7 illustrates an example of another action indicator interface of the stringed instrument example of the game system.
Figure 8:
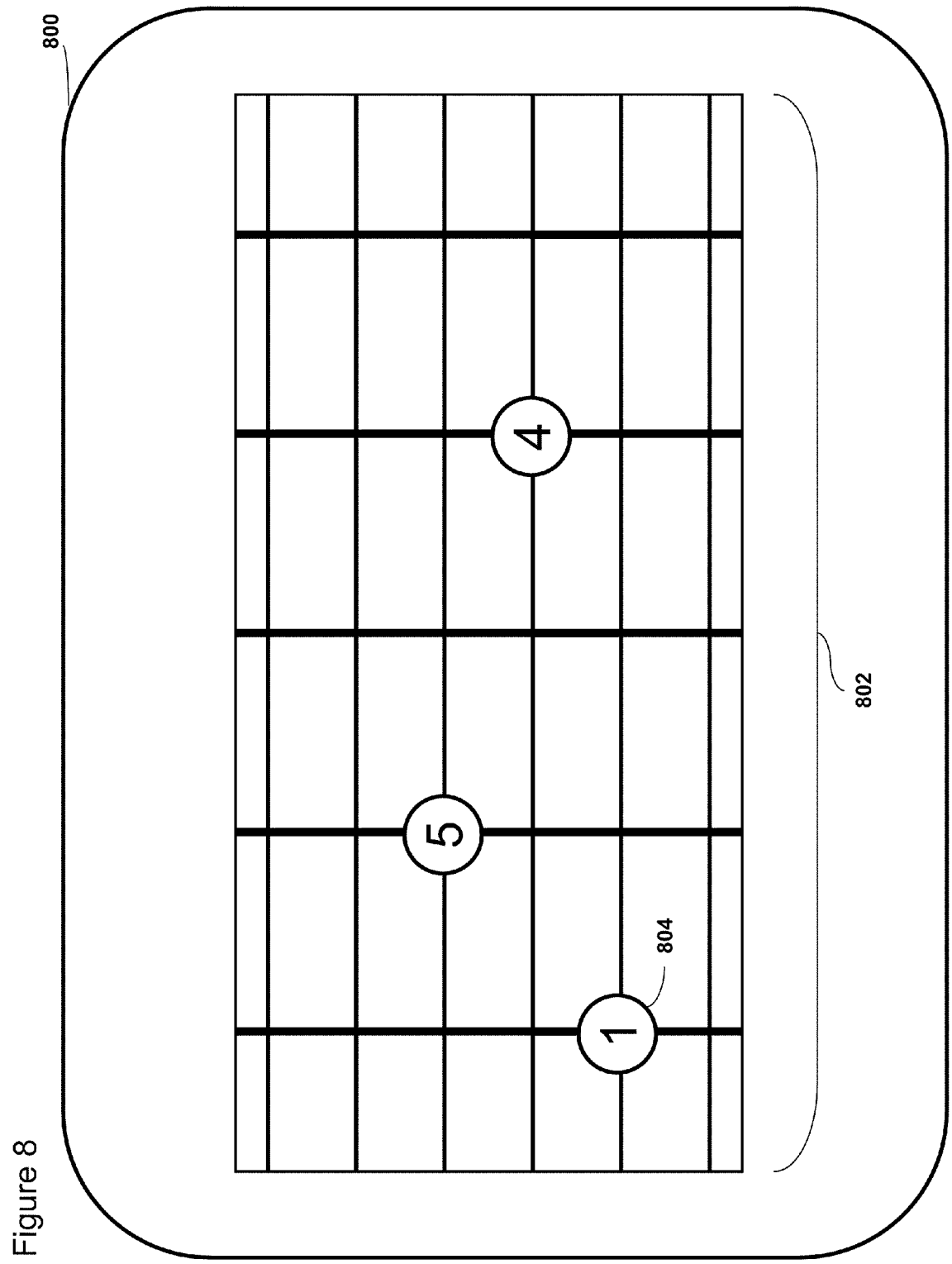
FIG. 8 illustrates yet another example of an action indicator interface of the stringed instrument example of the game system.
Figure 9:
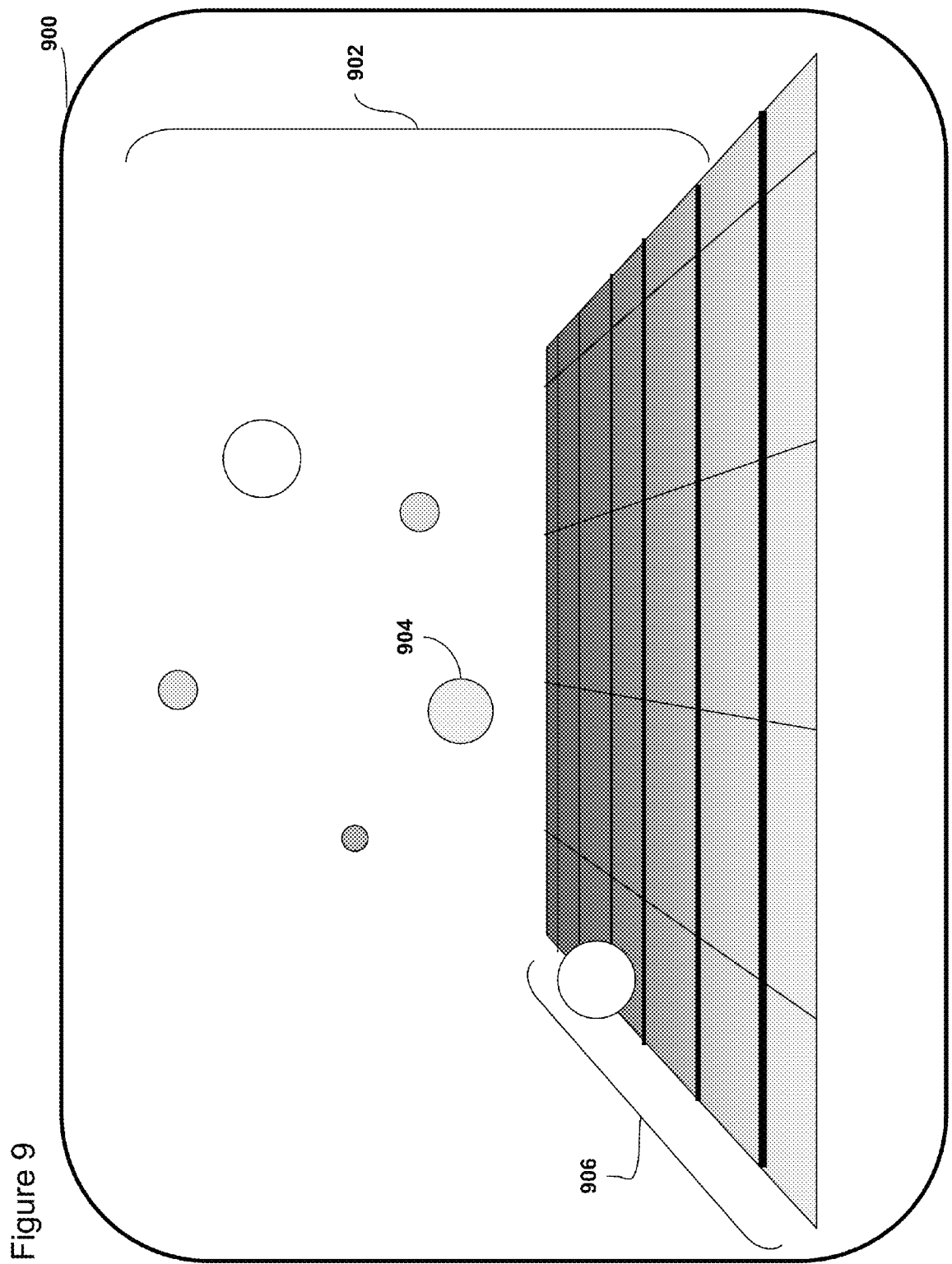
FIG. 9 illustrates yet another example of an action indicator interface of the stringed instrument example of the game system.

As another example, the horizontal position of the note indicating the time to play it (cue time), the vertical position indicating the string to play it on (cue string), and the number inside the note indicating the fret that is to be pressed down (cue fret) on the string to generate the correct pitch is an example of the user interface that may be used to cue the stringed musical instrument play and the variables that cue the play (which string, which fret, and what time), may be arranged spatially (horizontally spaced, vertically spaced, depth-wise spaced) and demarcated by notation (using numbers, letters, colors, shapes, etc) and may have many permutations as shown in FIG. 5. Examples of these different user interfaces are shown in FIGS. 6-9. FIG. 6 shows an embodiment of the action indicator interface 104 with a note field 602, one or more notes 604, and a play area 606 wherein the horizontal position of the note indicates the cue time, the vertical position of the note represents the cue fret, and the number inside the note represents the cue string. FIG. 7 shows another embodiment of the action indicator interface 104 with a note field 702, one or more notes 704, and a play area 706 wherein the depth-wise position of the note indicates the cue time, the horizontal position indicates cue string, and the numbers inside the notes represent the cue fret. FIG. 8 shows another embodiment of the Action Indicator Interface 100 with a note field 802 and one or more notes 804 in which the horizontal position represents cue fret, the vertical position represents cue string, and the numbers inside the notes represent the cue time (i.e. the number of seconds to wait before playing the appropriate string/fret combination). Finally, FIG. 9 shows another embodiment of the action indicator interface 104 with a note field 902, one or more notes 904, and a play area 906 in which the horizontal position represents the cue fret, the depth-wise position represents the cue string, and the vertical position represents the cue time (i.e. when to play the note depends on how fast the note falls and the string/fret combination cued by where the note falls in the play area). Any of the embodiments shown in FIGS. 1-9 may be further modified by using unique colors, characters, or shapes instead of numbers to cue the appropriate string/note/time. For instance, the six colors of red, green, blue, cyan, yellow, and magenta can be used to demarcate the cue string on a 6 string guitar. Also, for instance, the characters of the note may be used to demarcate the cue note (i.e. "C#", "D", "B flat", etc.) In addition to spacing along the traditional axis (i.e. horizontal, vertical, depth-wise), additional embodiments may space along non-traditional axes (i.e. diagonal). Additionally, there is no requirement that any or all axes be orthogonal (i.e. two axes may be parallel, near parallel, or otherwise not angled at 90 degrees).

Figure 6B:
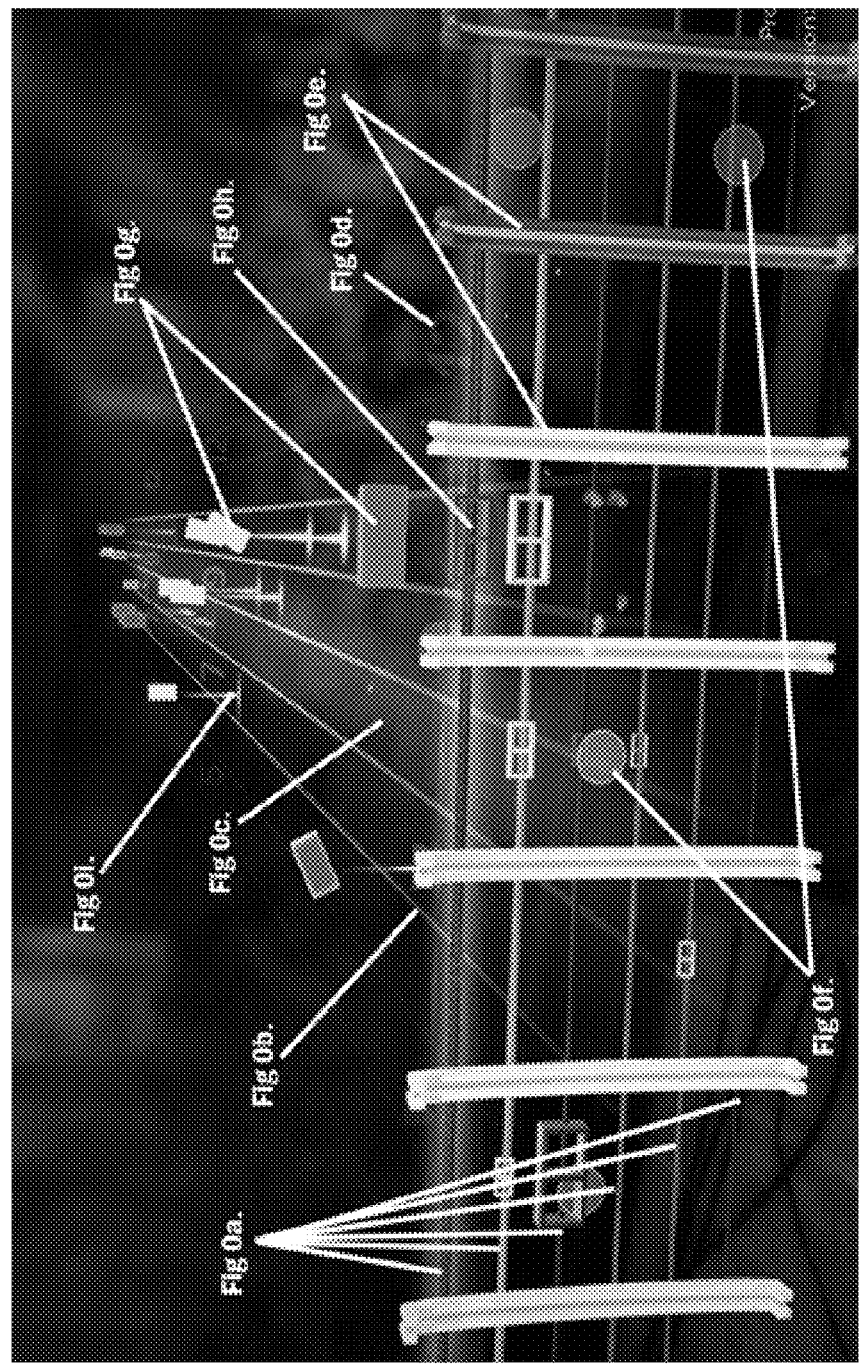
FIG. 6B illustrates an example of another embodiment of an action indicator interface of the stringed instrument example of the game system.

FIG. 6B illustrates an example of another embodiment of an action indicator interface 104 of the stringed instrument example of the game system. In this embodiment, the interface may have one or more string representations (FIG. 0a.), such as the six strings in FIG. 6B that indicate each string of a 6 string guitar. In a 4 stringed bass, the interface would show four strings represented on the screen. Like an actual stringed instrument, the top indicated string is thicker that the bottom string.

The interface may also have one or more lane markers (FIG. 0b.) in which the lane markers extend out of each fret and represent which fret the notes (FIG. 0g.) belong to. The space between two lane markers is known as the noteway.

The interface may also have one or more lane highlight (FIG. 0c.) wherein the highlighted lanes represent the currently active area of the guitar. The four lanes that are highlighted represent the recommended hand position the user should place their hand over. The left most highlighted lane is where the index finger should align with, the next lane to the right is for the middle finger, the third lane from the left is for the ring finger, and the right most lane the pinky.

The interface may also have lane numbers (FIG. 0d.) wherein the numbers 3-5-7-9-12-15-17-19-21 on the noteway is associated with inlays typically found on electric and acoustic guitars. The numbers help identify which fret a particular note is on. The left most lane is considered as fret 1, and the fret number increases consecutively rightward.

The interface may also have one or more frets (FIG. 0e.) wherein the space between two frets represents the area users are expected to hold down with their finger when a note appears on an active fret. There are two states of the fret, active and inactive. Active states are displayed in brighter colors than the inactive state to help convey the state. Active frets represent the area the next series of notes will appear on.

The interface may also have one or more fingerboard inlays (FIG. 0f) wherein the dots are visual representation of the fingerboard inlays that appear on guitars. The inlay shapes vary from guitar to guitar, but the common positions where the inlays appear are on the $3^{rd}$, $5^{th}$, $7^{th}$, $9^{th}$, $12^{th}$, $15^{th}$, $17^{th}$, $19^{th}$, and $21^{st}$ frets. The visual representation of the inlays on screen help the user understand the spatial relation of the on-screen guitar.

The interface may also have one or more notes (FIG. 0g.) wherein the notes represent the string and fret position the player should hold (or "fret") with their finger. The different colors of the notes match the string color—Red notes are for the red string, the yellow notes are for the yellow string, etc. The notes also are differentiated by different heights to help convey which string they belong to.

The interface may also have one or more containers (FIG. 0h.) wherein the containers represent on the fingerboard the location of the upcoming notes. When the container and the associated note collide, it indicates to the users the timing to pluck (or pick/strum) the string.

The interface may also have one or more stems (FIG. 0i.) wherein the stems serve two purposes: 1) to ground each note on the noteway to help reinforce the spatial position of the notes on the noteway; and 2) to reinforce the height of the note. The different heights of the note represent the string that the note belongs to.

Figure 10:
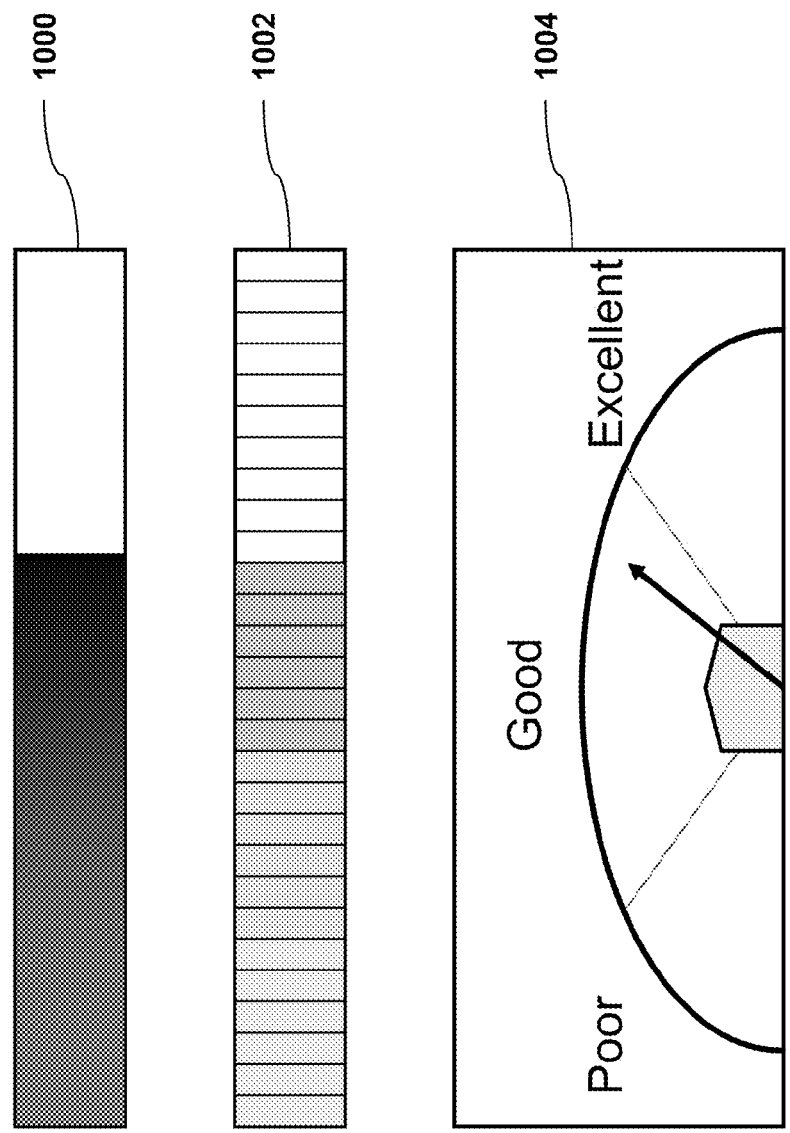
FIG. 10 illustrates an example of a performance meter user interface of the stringed instrument example of the game system.

The game system user interface may also include, in some embodiments, a performance feedback interface and several components of the user interface 100 may loosely define a mechanism for a player to receive feedback on their performance in the game. In some embodiments, the user interface 100 may include a score window 112 or other graphic that is used to present the player's current score during their performance. In some embodiments, a performance meter 114 may also be used to present the player's current performance which is a measure of the number of hit notes and missed notes and, if the player's performance falls below a predetermined level, the game may end. FIG. 10 shows alternative embodiments of performance meters. In some embodiments, the performance meter is a bar graph filled or unfilled with colors or patterns based on the player's performance, shown by 1000/1002 in FIG. 10. In some embodiments, the performance meter resembles an analog meter, where the needle moves up and down to indicate the player's performance, shown by 1004 in FIG. 10.

The user interface 100 of the game system in some embodiments may further comprise a chord track 116 that may be, for example, located above the note field 106. During game play, chord information appears in the chord track 116 and scrolls from right to left towards that stationary play area 110. Each piece of chord data lines up with a corresponding note(s) 108 in the note field 106 to show the association between the two.

The user interface 100 of the game system in some embodiments may further comprise a signal feedback interface wherein several components in the user interface 100 loosely define a mechanism for the player to receive the quality and power of the instrument signal being fed into the game. In some embodiments, a volume meter 118 shows the total volume of the player's instrument during instrument play. In some embodiments, a signal plot 120 shows a plot of the power of the player's signal vs. the note so that the signal plot will show peaks at the tone(s) the player is playing.

The user interface 100 of the game system in some embodiments may further comprise a combo feedback interface wherein several components in the user interface 100 loosely define a mechanism for the player to receive information on the number of correctly played notes that have been "hit" in a row (i.e. a combo of correct notes). In some embodiments, textual information 122 displays the current combo number. In some embodiments, a combo bar 124 is used, containing a graphical representation of the number of combo notes played together 126, as well as a display of a score multiplier 128 gained because of successful combos.

Figure 11:
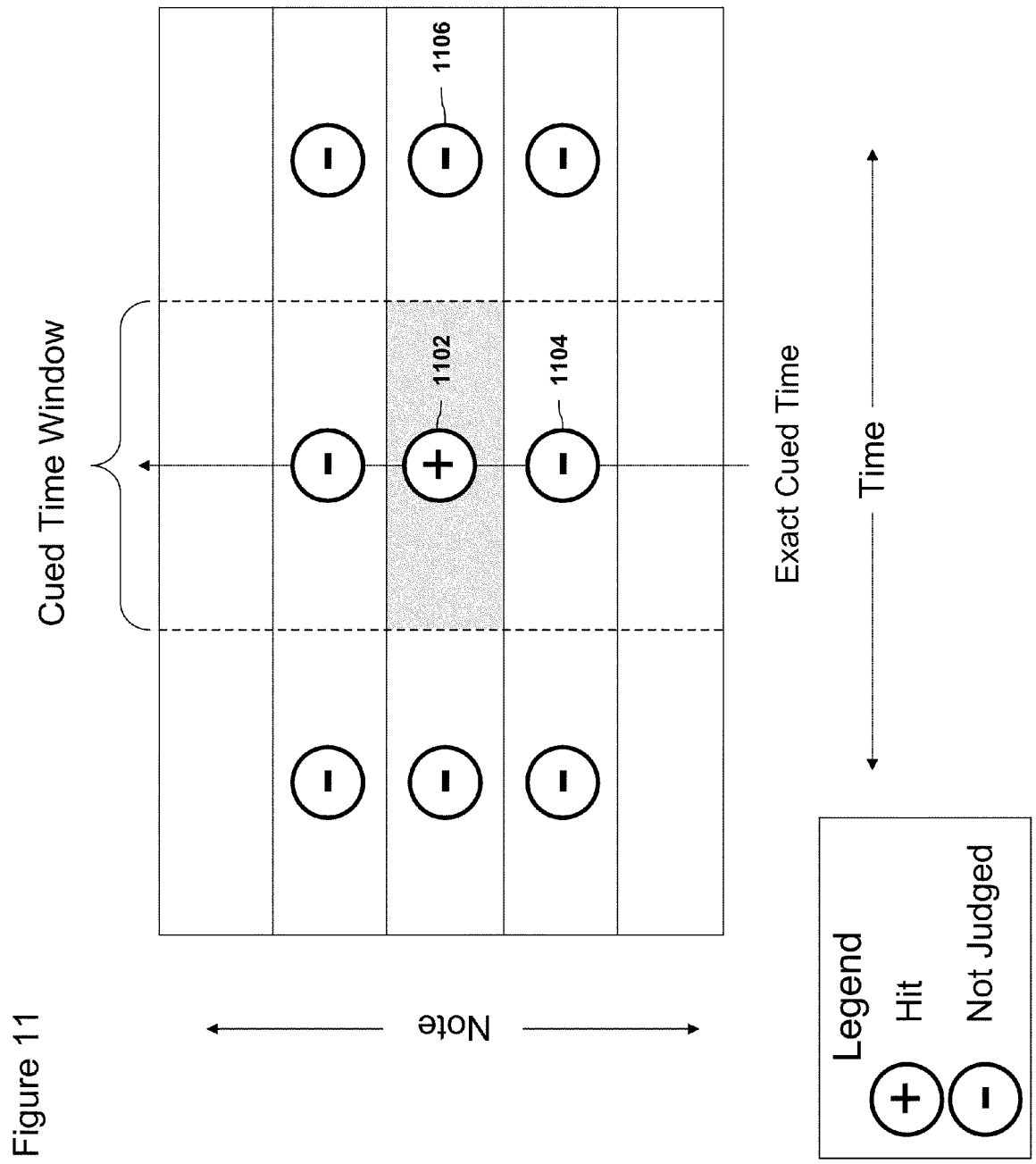
FIG. 11 illustrates a method for scoring notes in the stringed instrument example of the game system.

FIG. 11 illustrates a method for scoring notes in the stringed instrument example of the game system. If the player plays the arrangement note within the time window allotted around the cued time, the arrangement note is scored as a "Hit" (1102). If the wrong note is played (1104), or the arrangement note is played but not within the time window (1106), no judgment is given. Therefore, it is possible for the player to play several wrong notes but still receive a "Hit" after finally playing the correct arrangement note. If the arrangement note is never played, then a "Miss" is scored.

Figure 12:
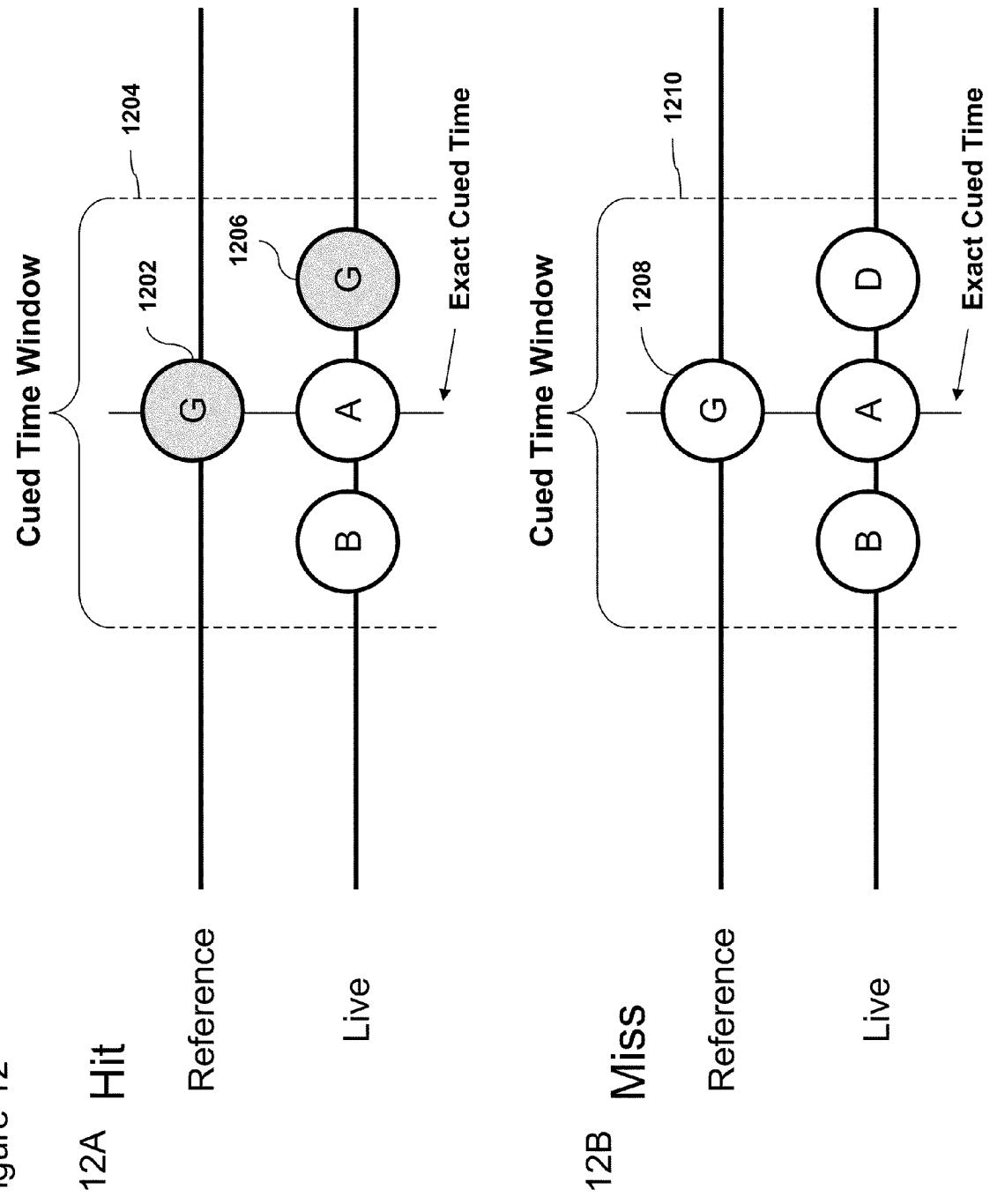
FIGS. 12A and 12B illustrate a hit scoring event and a miss scoring event of the stringed instrument example of the game system.

FIGS. 12A and 12B illustrate a "hit" scoring event and a "miss" scoring event, respectively. As shown in FIG. 12A, the arrangement note "G" has been cued (1202) accompanied by a time window that is shown (1204). A "Hit" is scored in FIG. 12A because the performance by the user contains the note "G" (1206) within the time window (1204). In FIG. 12B, the arrangement note "G" has also been cued (1208) with a time window (1210). However, a "Miss" is scored in FIG. 12B because no note "G" is played in the user performance in the time window. Generally, the live instrument performance of the player will be a continuous signal (with pitches) that therefore is converted in a known manner into notes with time tags so that the game system is able to compare the notes of the arrangement with the notes of the live instrument performance. To accomplish this conversion, the system (such as the analysis module described with reference to FIG. 24 below) may determine the periodicity component of the pitch so that the periodicity component can be converted into a frequency which can then be converted into a note.

Figure 13:
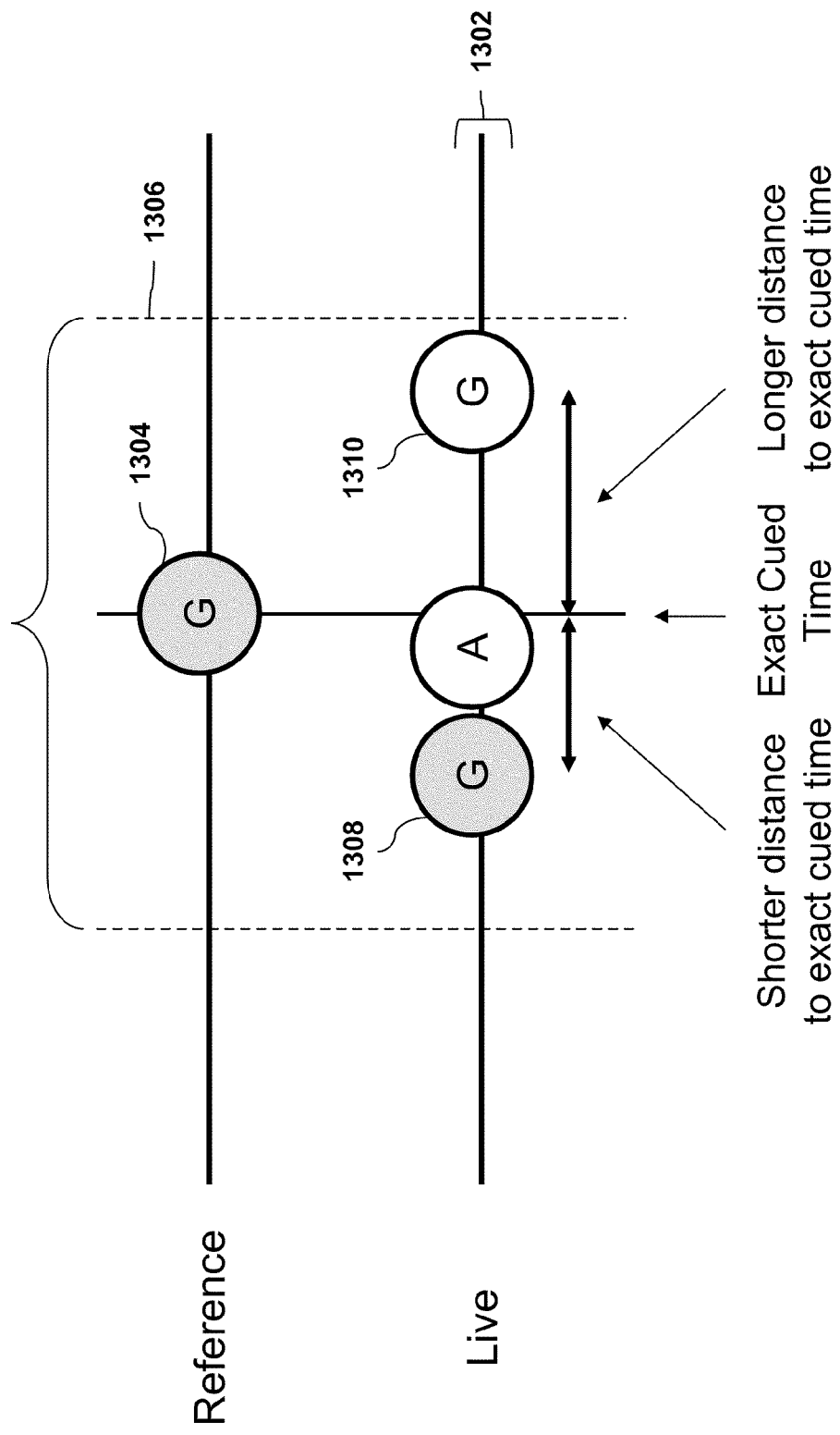
FIG. 13 illustrates an example of a method for scoring the notes of the stringed instrument example of the game system.

FIG. 13 shows which of the performance notes by the user (1302) will be judged/scored if the player plays multiple arrangement notes within the time window. For example, a note "G" in the arrangement has been cued (1304) accompanied by a time window (1306). The player has played "G" twice within the time window (1306), at time 1308 and time 1310. However, time 1308 is closer in time to the arrangement note 1304 and is therefore the one selected for scoring.

Figure 14:
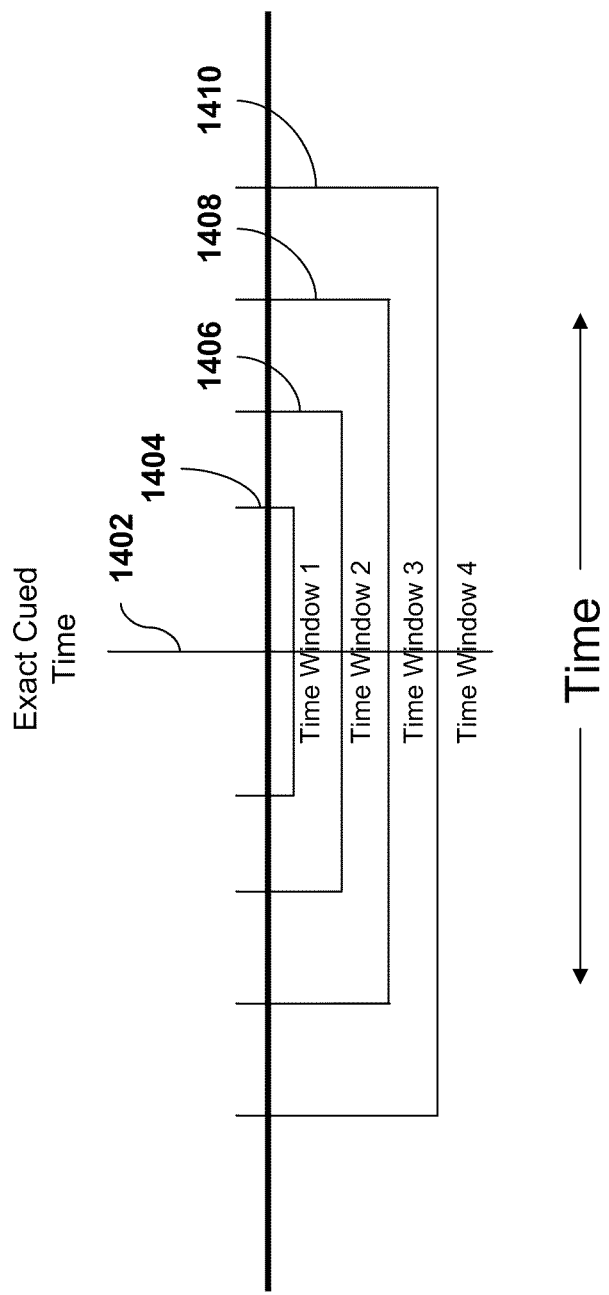
FIG. 14 illustrates an example of the stringed instrument example of the game system in which several time windows are used to score a note.

In some embodiments, there may be several time windows associated with an arrangement note 1402 as shown in FIG. 14 wherein four different time windows are shown. Each time window allows the player a greater time tolerance for playing the correct arrangement note. In some embodiments, the scoring may be done by giving higher scores to the user performance notes that are in the smaller time windows. For instance, 1404, 1406, 1408, and 1410, may be judged as "Great", "Good", "Fair", and "Poor" and be given a score 4, 3, 2, and 1 respectively. Also, there is no requirement that the time window be symmetrical, as more of a window can be given after the exact cued time 1402 that before it, or vice versa.

In some embodiments, the scoring of notes can be done independent of the octave of the note so that notes played that are one of more octaves higher or lower than the cued note will still be scored positively (i.e. a "Hit"). In these embodiments, the note of the live instrument performance data point is adjusted by one or more octaves so that the adjusted note is then compared to the arrangement note. Then, the live instrument performance is scored positively if the adjusted note is equal to the arrangement note and the live musical performance is not scored if the adjusted note does not match the arrangement note.

The game system may include a level scoring module. In the game, each level is scored based on the number of "Hits" vs. "Misses" awarded to the player. In embodiments with multiple time windows, "Hits" would be subdivided further into "Great", "Good", "Fair", "Poor", etc. In some embodiments, scoring for a level is done by the multiplying the number of judged notes by multipliers assigned for each rating (i.e. Miss-0, Poor-1, Fair-2, Good-3, Great-4). In some embodiments, a score above a certain amount will unlock one or more unlocked items (i.e. a song, a new character, a new character outfit or guitar, etc.). In some embodiments, a score below a certain amount will "fail" the player and thus not allow the player to progress to the next level.

Figure 15:
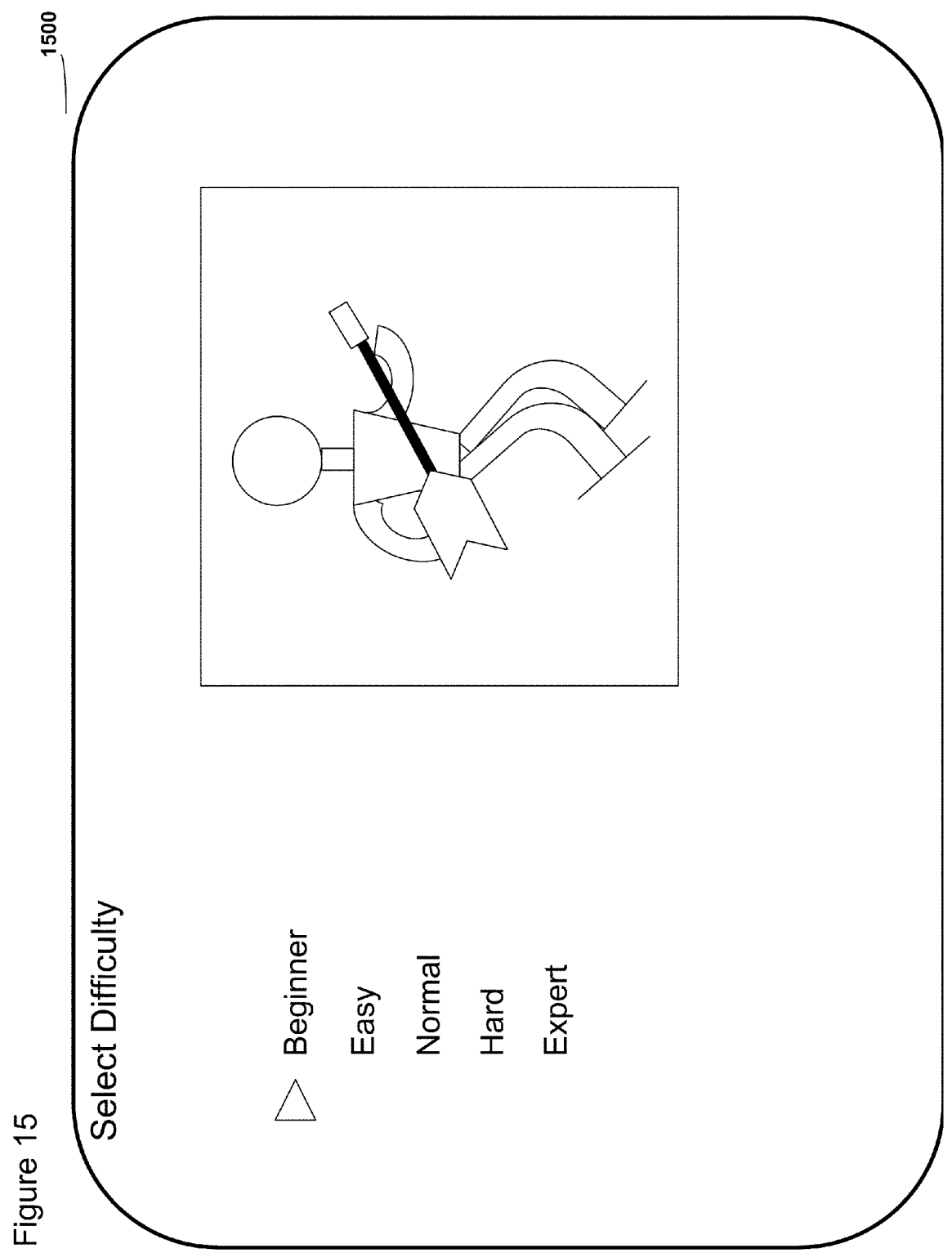
FIG. 15 illustrates an example of the user interface for selecting a level of difficulty of the stringed instrument example of the game system.

The game system may also adjust the difficulty of each level of the game. For example, as shown in FIG. 15, the same song may be played with several different level difficulties using a select difficulty screen 1500.

Figure 16:
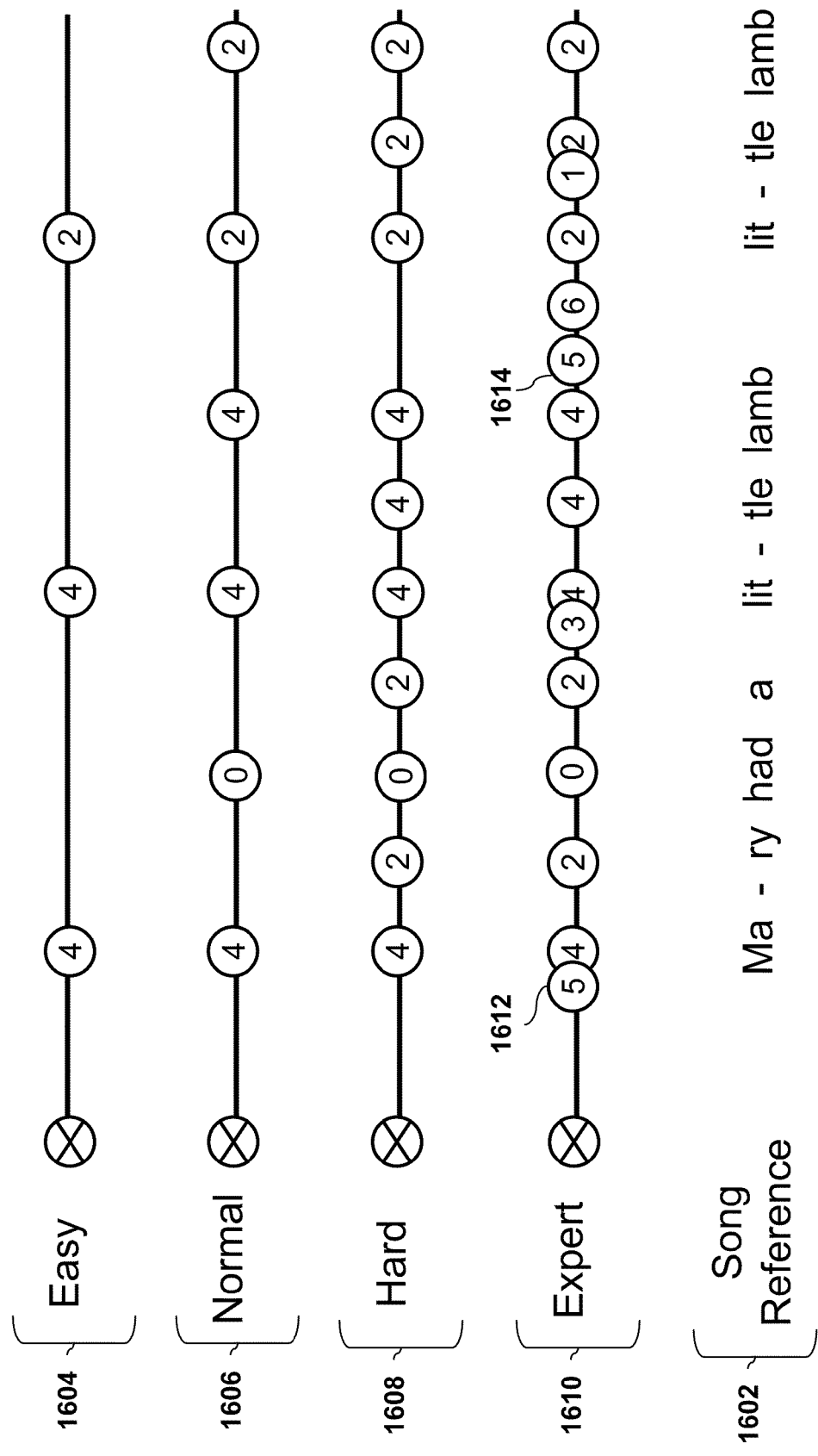
FIG. 16 illustrates examples of a sequence of notes with different difficulty levels in the stringed instrument example of the game system.

In the game system, different arrangements of musical pieces can be used to give more difficult and challenging experiences of playing the same musical piece, as shown by FIG. 16. The piece shown, "Mary Had a Little Lamb", has its rhythmic components shown by 1602. An "Easy" arrangement of the piece 1604 may be composed by cueing only every $4^{th}$ note. An arrangement more difficult than the Easy arrangement, denoted as "Normal" 1606, cues only every $2^{nd}$ note. An arrangement more difficult than Normal, denoted as "Hard" 1608, cues the player to play every note in the melody. An arrangement more difficult than Hard, denoted as "Expert" 1610, cues the player to add grace notes 1612 and other extra note runs 1614 to the original musical piece. Furthermore, when the difficulty of an arrangement is made more difficult, the time window for each note may be made smaller than the time window for the note during an easier version of the arrangement.

Figure 17:
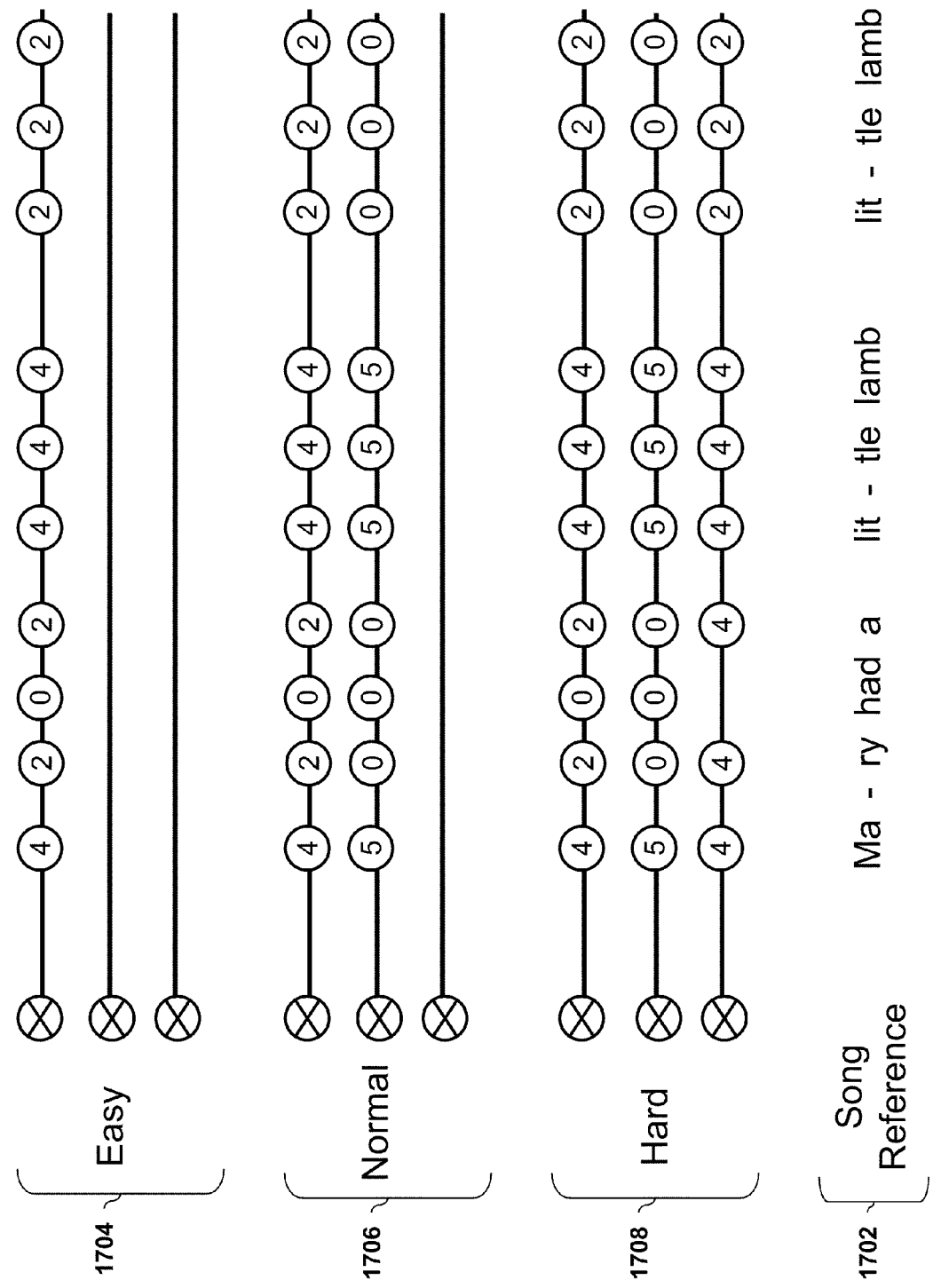
FIG. 17 illustrates examples of another sequence of notes with different difficulty levels in the stringed instrument example of the game system.

An alternate arrangement technique is illustrated in FIG. 17. The piece shown, "Mary Had a Little Lamb", has its rhythmic components shown by 1702. An "Easy" arrangement of the piece 1704 may be composed by cueing every note in the melody. An arrangement more difficult than Easy, denoted as "Normal" 1706, cues additional harmonies to be played on other strings in synchronization with the original melody. An arrangement more difficult than Normal, denoted as "Hard" 1708, cues even more additional harmonies to be played on other strings in synchronization with the original melody. In this way, the difficulty of any arrangement can be adjusted by the game system.

Figure 18:
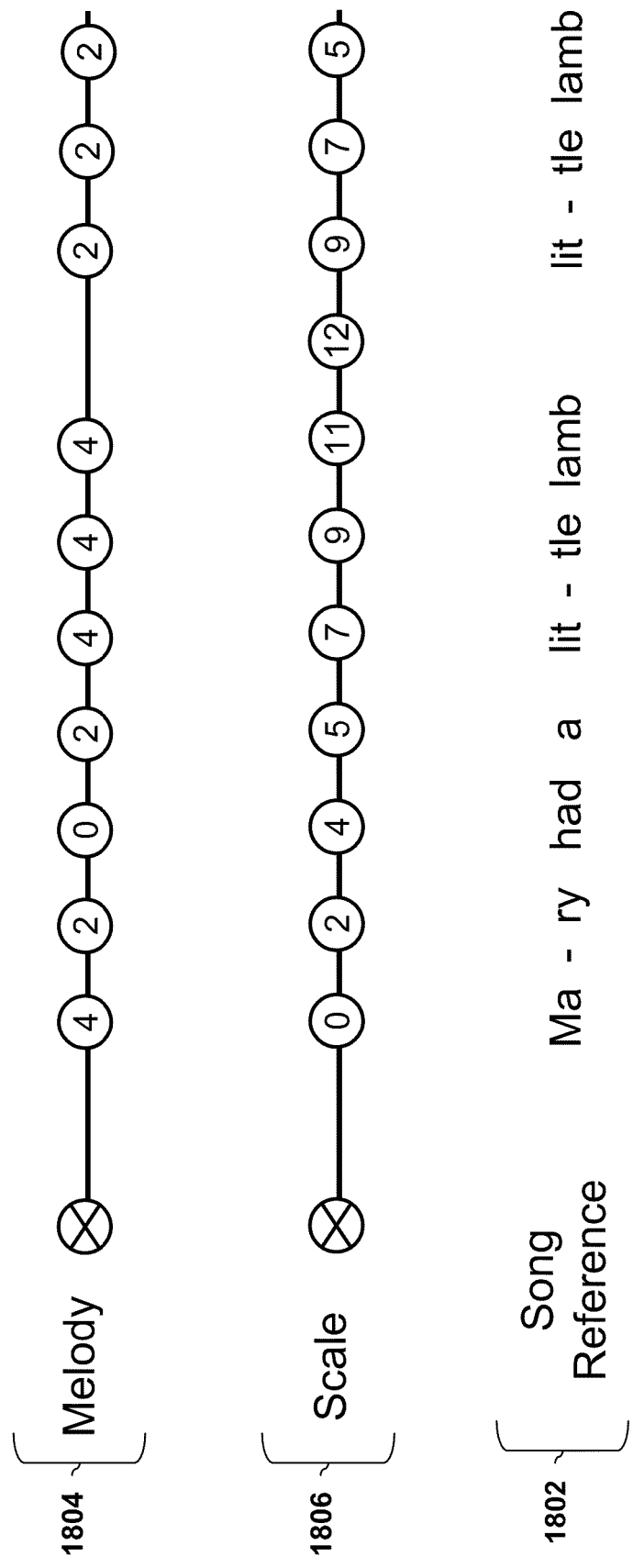
FIG. 18 illustrates an example of an arrangement of a musical arrangement of the stringed instrument example of the game system.

In addition, arrangement of songs do not have to follow the traditional melodies as shown in FIG. 18. In particular, arrangements may be designed where musical theory fundamentals (i.e. scales, chords, arpeggios, etc.) are cued instead. The piece shown, "Mary Had a Little Lamb", has its rhythmic components shown by 1802. While the melody is shown in 1804, an equally valid series of notes consist of a major scale 1806 in the same key as the musical selection. In some embodiments, more difficult arrangements of musical pieces contain a more difficult series of notes to be played together in sequence (i.e. guitar riffs).

Figure 19:
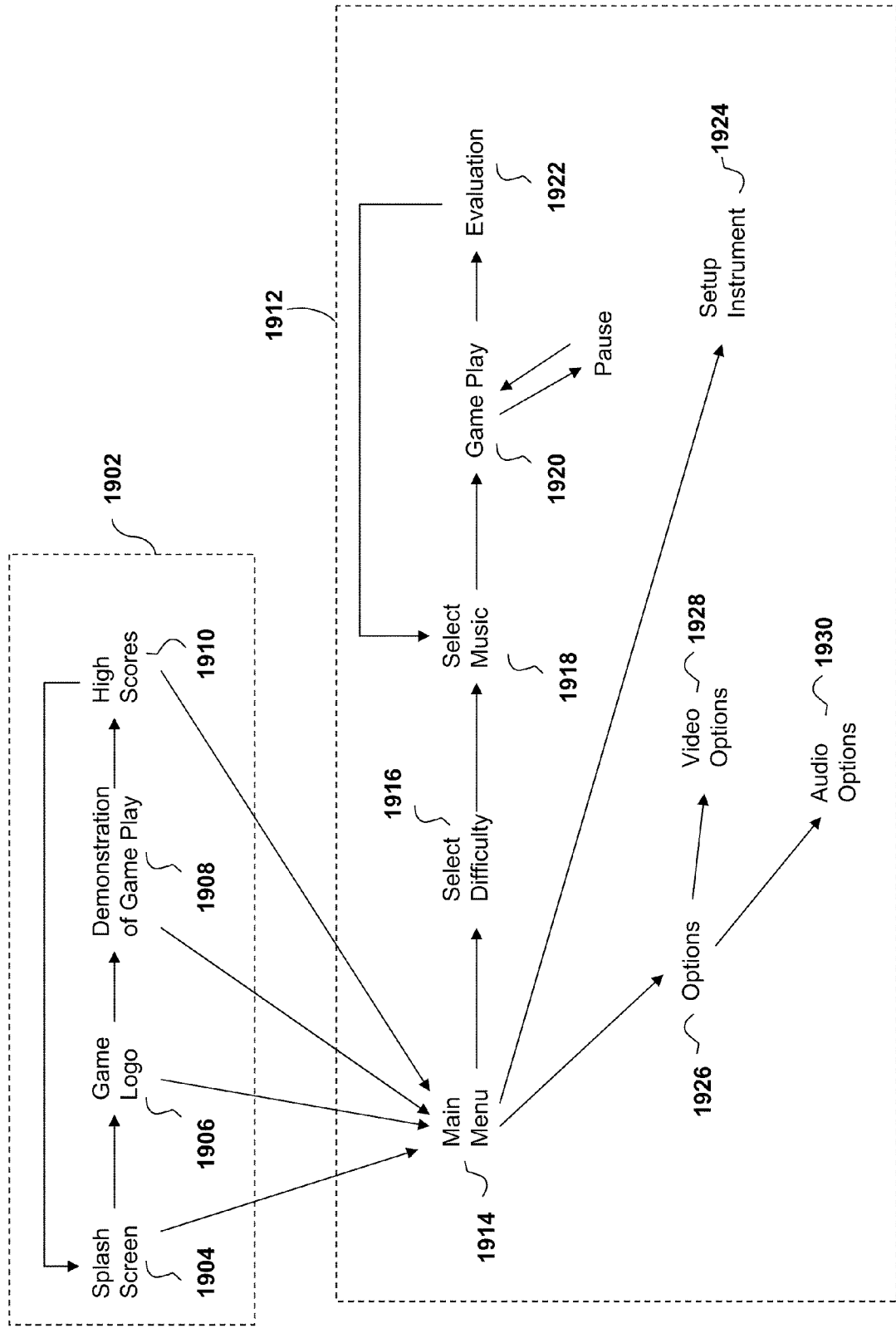
FIG. 19 illustrates an example of a menu in the stringed instrument example of the game system.
Figure 20:
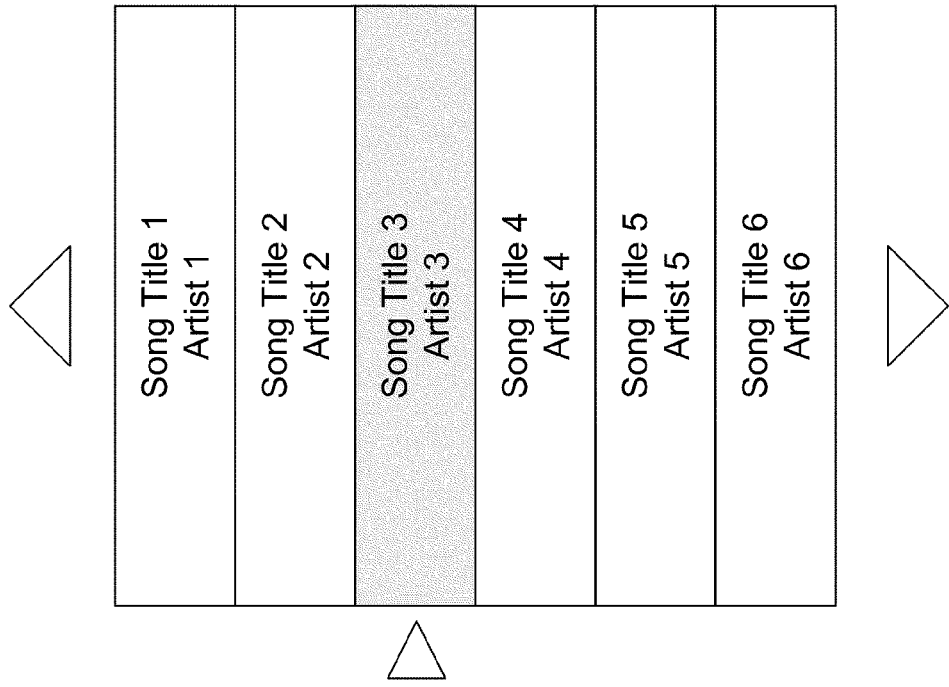
FIG. 20 illustrates an example of a select arrangement user interface of the stringed instrument example of the game system.
Figure 22:
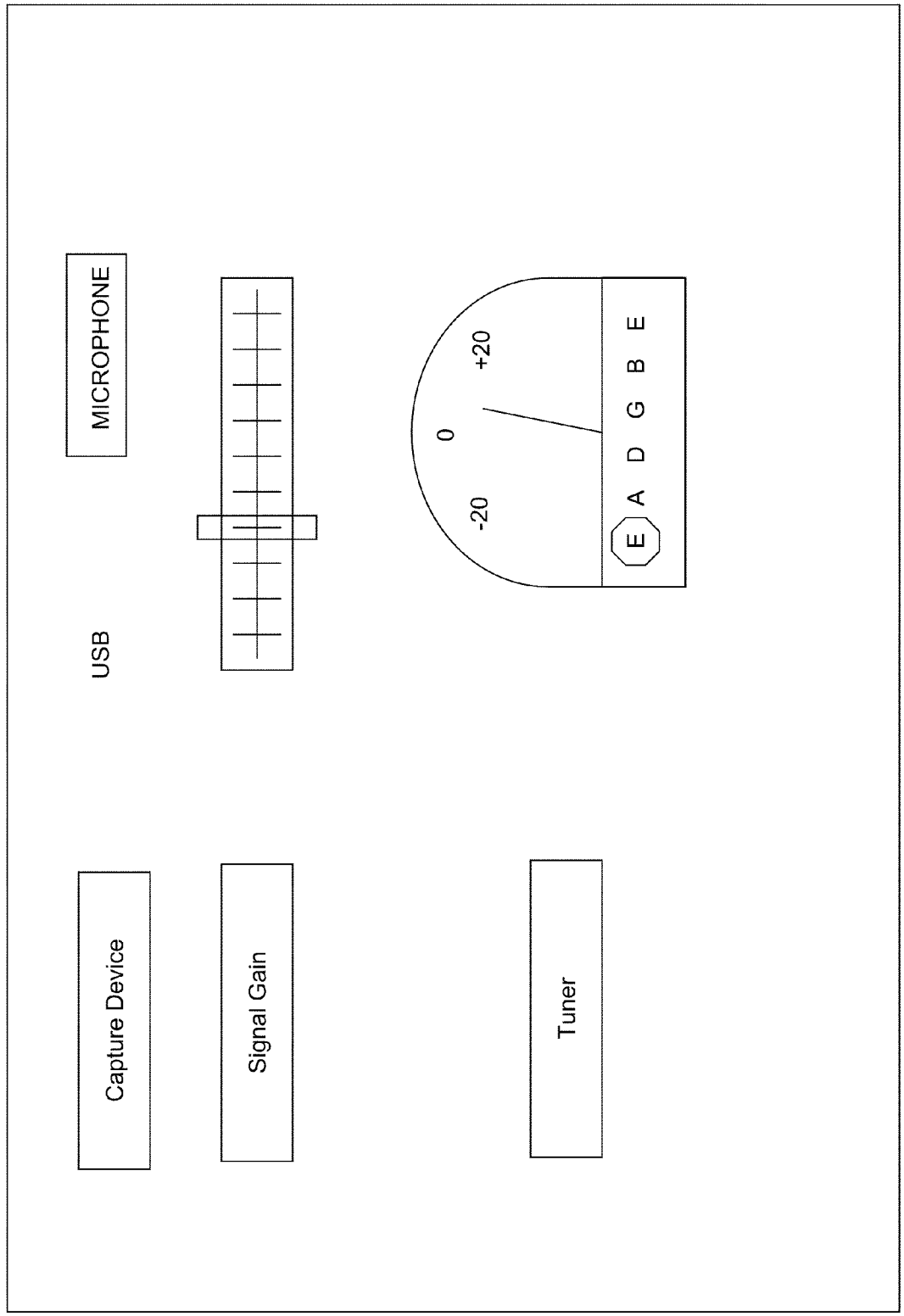
FIG. 22 illustrates a sound input device and gain user interface of the game system.

FIG. 19 illustrates an example of a progression of menu screens in the stringed instrument example of the game system wherein 1902 shows a non-interactive progression of screens, which may include a splash screen 1904 that displays the game developer's logo, a logo screen 1906 that displays the game logo, a demonstration screen 1908 that shows the game being autoplayed or played by a computer, and a list of high scores 1910. The user is taken to the interactive progression of screens 1912 after the user interacts with the game (i.e. presses Enter on the keyboard). The main menu 1914 lists available options. The select difficulty screen 1916 allow the player to select their desired song difficulty (FIG. 15). The select music screen allows the player to select a song to play (FIG. 20). The game play screen 1920 is the main game screen (FIG. 1B), which may be paused and then resumed. After game play, the player is taken to an evaluation screen 1922 to review their performance. From the main menu 1914, the player may select the setup instrument screen 1924 to tune their instrument and set up an appropriate sound input device and signal gain (FIG. 22). Also from the main menu 1914, the user may select other options 1926, which will give them the ability to adjust video options 1928 (fullscreen or windowed game, screen resolution, etc.) (FIG. 21b) or audio options 1930 (music volume, sound effects volume, etc.) (FIG. 21a).

Figure 23:
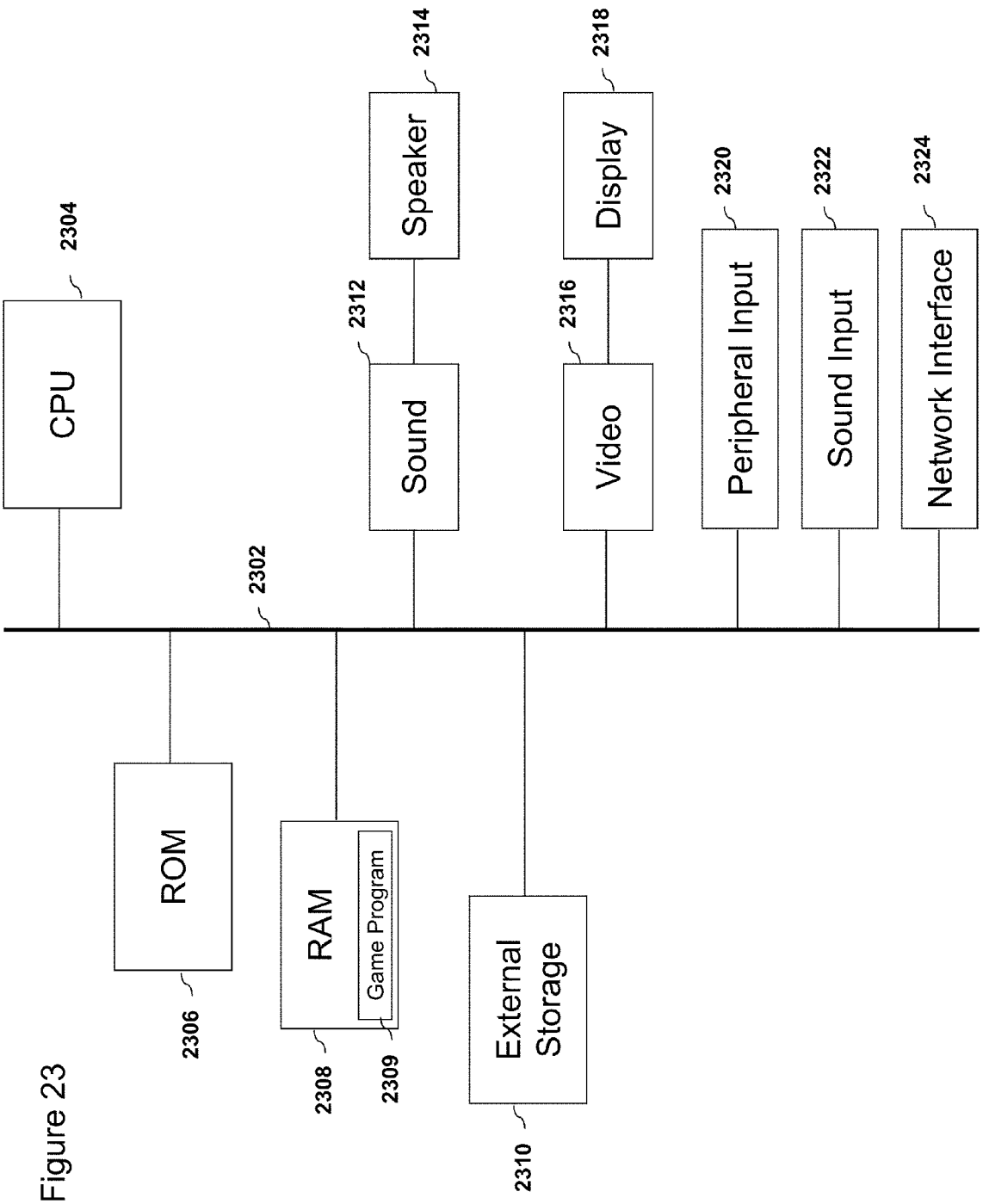
FIG. 23 illustrates an example of a hardware implementation of a video game system that incorporates the stringed instrument example of the game system.

FIG. 23 illustrates an example of a hardware implementation of a video game system that incorporates the stringed instrument example of the game system. The game system may include a system bus 2302, a ROM 2306 that holds the operating system and a memory 2308 (such as a RAM) that holds the game program 2309. The game system may also include an external storage 2310 that can either be a computer's hard drive, an optical disk, or a flash memory drive, etc. The game system also has a sound module 2312 that connects to the speaker 2314 and a video module 2316 that processes graphics and connects the display 2318, which can be a computer monitor, TV, or arcade screen. The game system may also have a peripheral input 2320 that takes input from the user's keyboard, mouse, buttoned game controllers, racing wheels, etc and a sound input 2322 that takes input from the user's musical instrument and can be a USB cable, microphone, amplifier cord with adapter for computer sound card, networking cable carrying musical data information, etc. The game system may also have a network interface 2324 that takes data in and sends data out over a network for networked play and it can send or receive game data (player profiles, "Hits", "Misses", etc.), sound data (from a musical instrument), or music data (i.e. mp3 or .ogg data from a music file).

Figure 24:
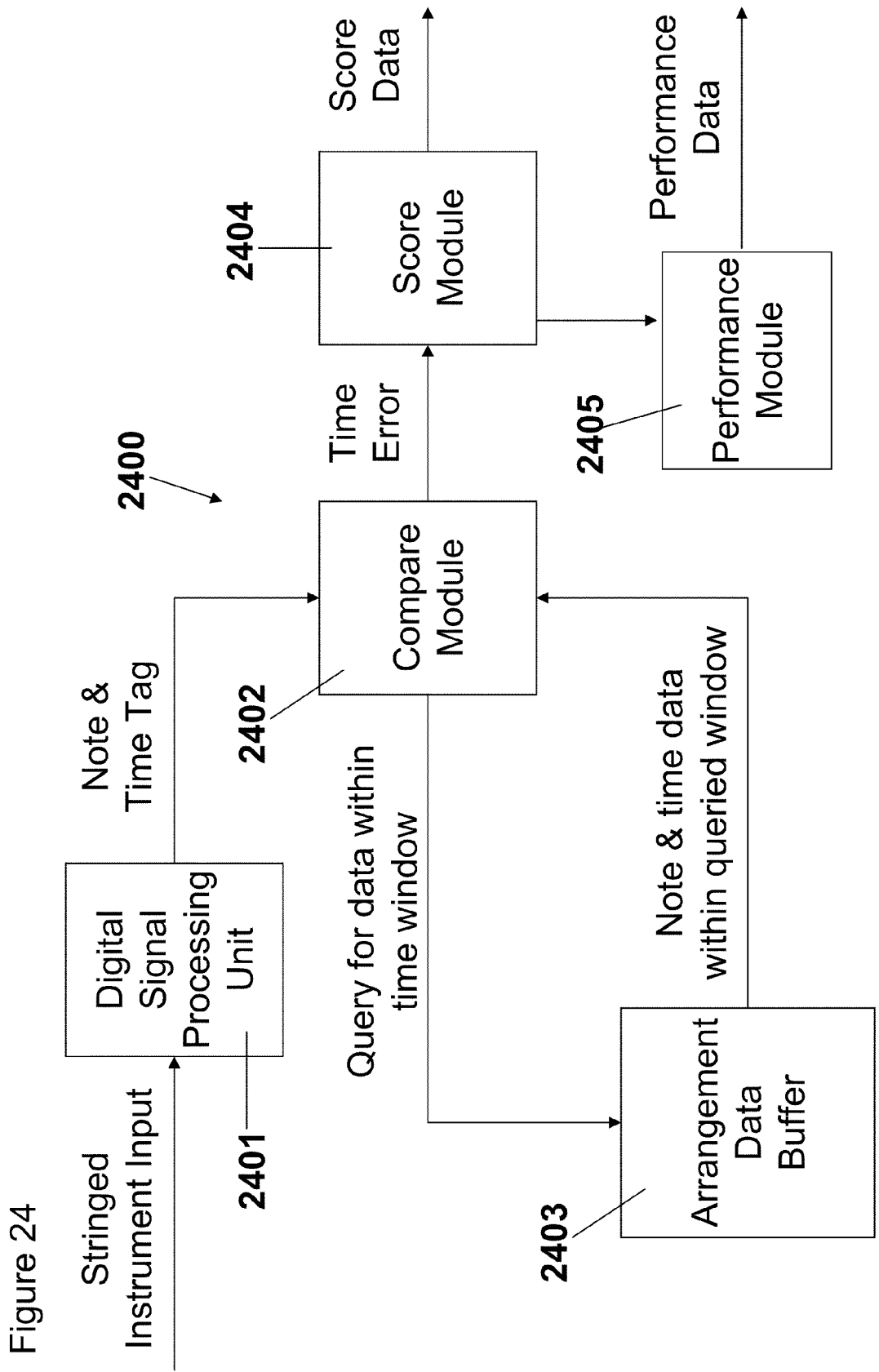
FIG. 24 illustrates further details of an analysis module of the exemplary embodiment of the game system shown in FIG. 1A.

FIG. 24 illustrates further details of an analysis module 2400 that is part of the exemplary embodiment shown in FIG. 1A. The analysis module may receive an instrument input that is fed into a processing unit 2401, such as a digital signal processing unit (DSP), that detects one or more notes (and a time tag for each note) in the live instrument input using known pitch conversion and note detection processes (described above) programmed into the DSP. The note and time tag information may be fed into a compare module 2402 (implemented as one or more lines of computer code in one embodiment) that queries the arrangement storage at a particular time period and then compares the live performance notes and time tags to a set of arrangement performance notes and time tags that may be stored in a buffer 2403 as shown. The comparison may be done by determining if the notes match and, if the notes match, then finding the live instrument note with the smallest time error. The compare module then may output a time error to a score module 2404 (implemented as one or more lines of computer code in one embodiment) that generates score data which is output to the player and also output to a performance module 2405 (implemented as one or more lines of computer code in one embodiment) that outputs performance data that indicates the performance level of the particular player. Now, an adaptive adjustment process that may be part of certain embodiments of the instrument game system is described in more detail.

Adaptive Adjustment Process

Figure 25:
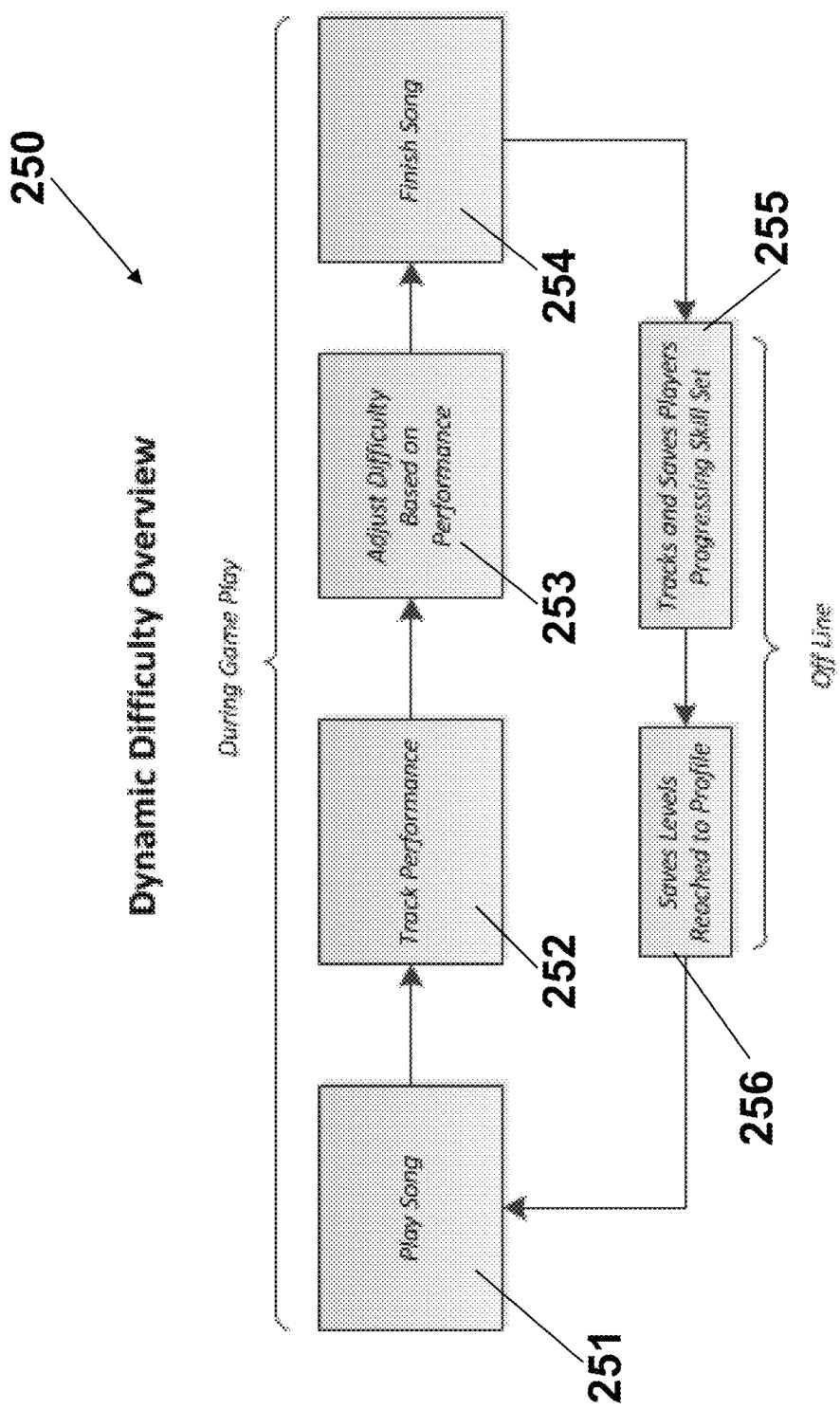
FIG. 25 illustrates an adaptive adjustment process that can be implemented by the game system.

FIG. 25 illustrates an adaptive adjustment process 250 that can be implemented by the game system. The idea is that the game's difficulty adapts to the players skill level so that they are always challenged but not overwhelmed. The adaptive adjustment process described below may be implemented in hardware (a programmed hardware device) or in software (code running on a computer that is executing the instrument game system) or a combination of hardware and software. To accomplish the adaptive adjustment, the adaptive adjustment process begins when a song is played (251) and the adaptive adjustment process tracks the player's performance (252) and adjusts the difficulty based on the player's performance (254) as described below in more detail until the song is completed (254). The adaptive adjustment process moves phrases up in difficulty if the player does well with the particular phrase and moves the phrases down in difficulty if the player does poorly with the particular phrase which are described below in more detail. The above steps are performed in real time during the game play so that the game play adapts to the player's skill level. The adaptive adjustment process may also perform some action off-line (not in real time) that include tracking and saving each player's progressing skill set (255) and saving the levels for each phrase reached by each player (256) so that the game is always adapting to the player's skill set.

Figure 26:
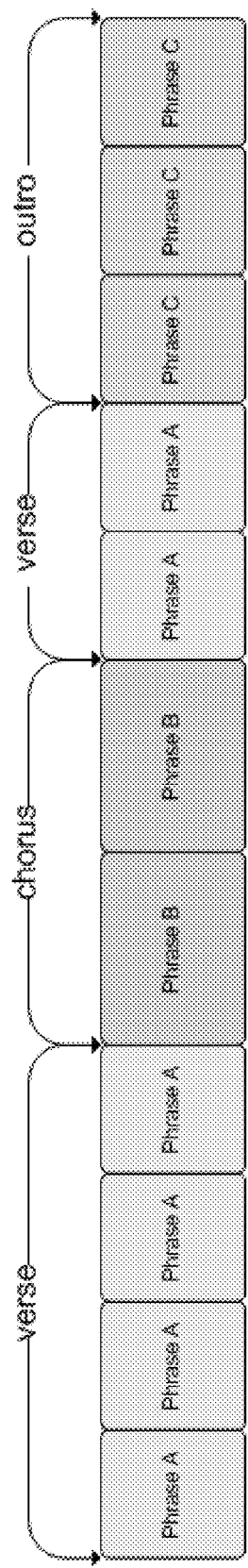
FIG. 26 illustrates a song being split into phrases.

FIG. 26 illustrates a song being split into phrases. In the adaptive adjustment process, each song is broken up into phrases so that the player's progress can be tracked for each phrase which is smaller than an entire song. Each phrase is a piece of melodic and rhythmic material that repeats. (i.e., the hook of "Smoke on the Water") and phrases may end up repeated many times throughout a section. In the example in FIG. 26, the A Phrase repeats 4 times during the verse and the B Phrase spans more measures than the A Phrase and only ends up repeating twice over the chorus. In the example, the particular song also has a C phrase that is part of the outro of the song.

Figure 27:
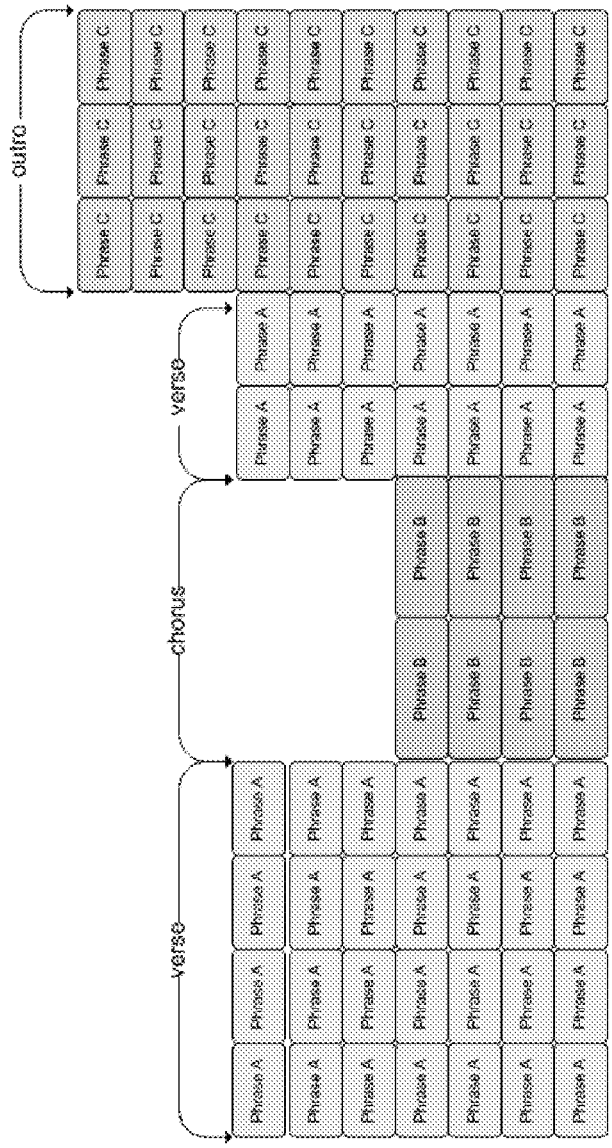
FIG. 27 illustrates the difficulty assigned to each phrase of a song.

FIG. 27 illustrates the difficulty assigned to each phrase of a song in that the adaptive adjustment process assigns a difficulty to each phrase and the difficulty of each phrase. In particular, when making levels, the system starts with the simplest abbreviation of a phrase and the makes small changes on each iteration of that phrase's difficulty until the full part is represented. Since some phrases are naturally more difficult than others, each phrase uses as many difficulty levels necessary in order to create a smooth transition from level 0 to full part. Thus, in the example shown in FIG. 27, the C phrase is more complex than the other phrases and is built with more difficulty levels as shown by the larger number of difficulty levels (10).

Figure 28:
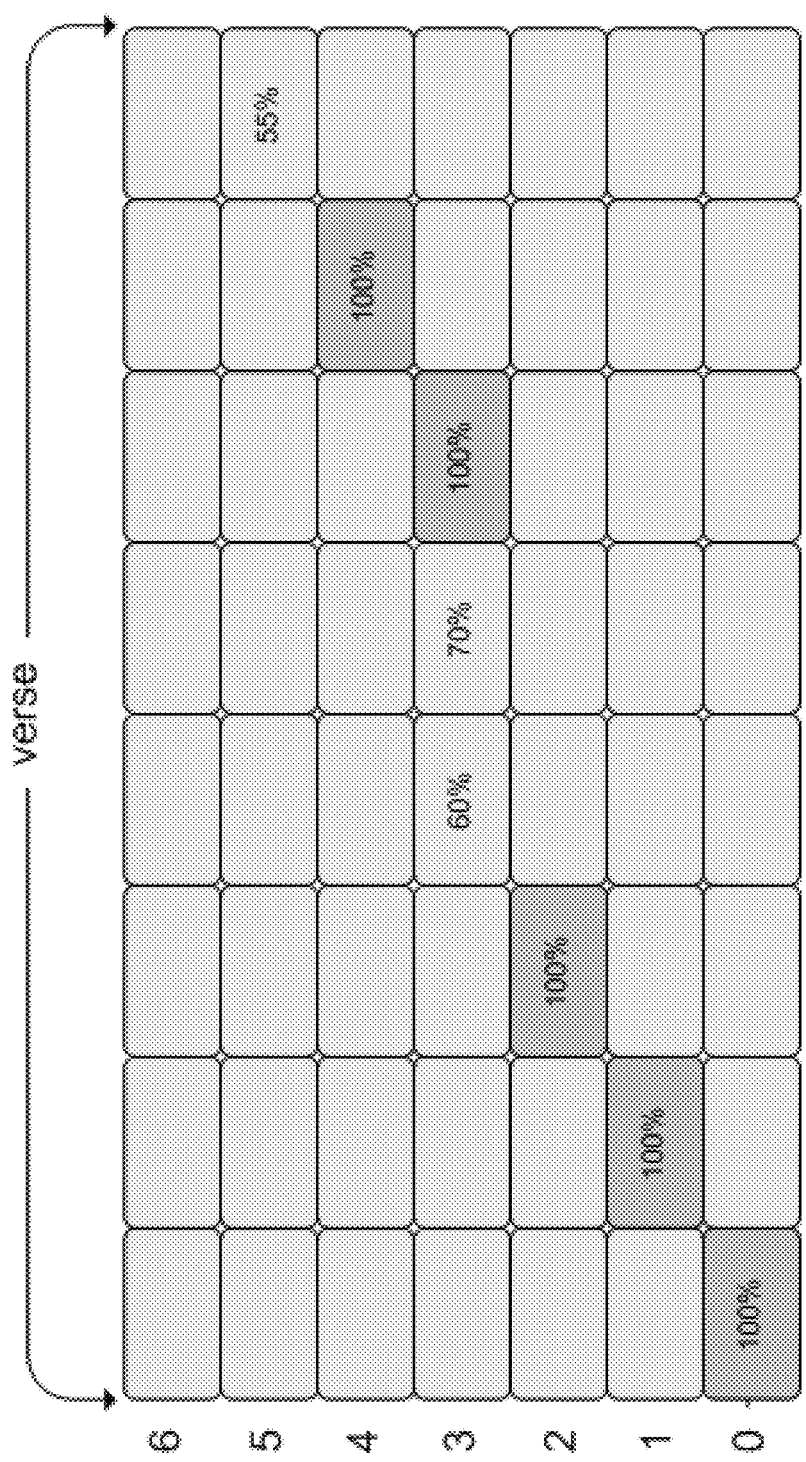
FIG. 28 illustrates a level up logic of the adaptive adjustment process.

FIG. 28 illustrates a level up logic of the adaptive adjustment process which is the process by which a player's difficulty for a particular phrase is increased. The player must get N % (i.e., 100%) of the notes in a phrase in order to level-up (increase the difficulty of) that phrase. The leveling up takes place on the next instance of that same phrase. If the player only gets M %-O % (i.e., 50-99%) of the notes, the phrase does not level up. In the example shown in FIG. 28, the player levels up (levels 0-2), but gets stuck on level 3 for three phrases until continuing the increase in difficulty of the particular phrase.

Figure 29:
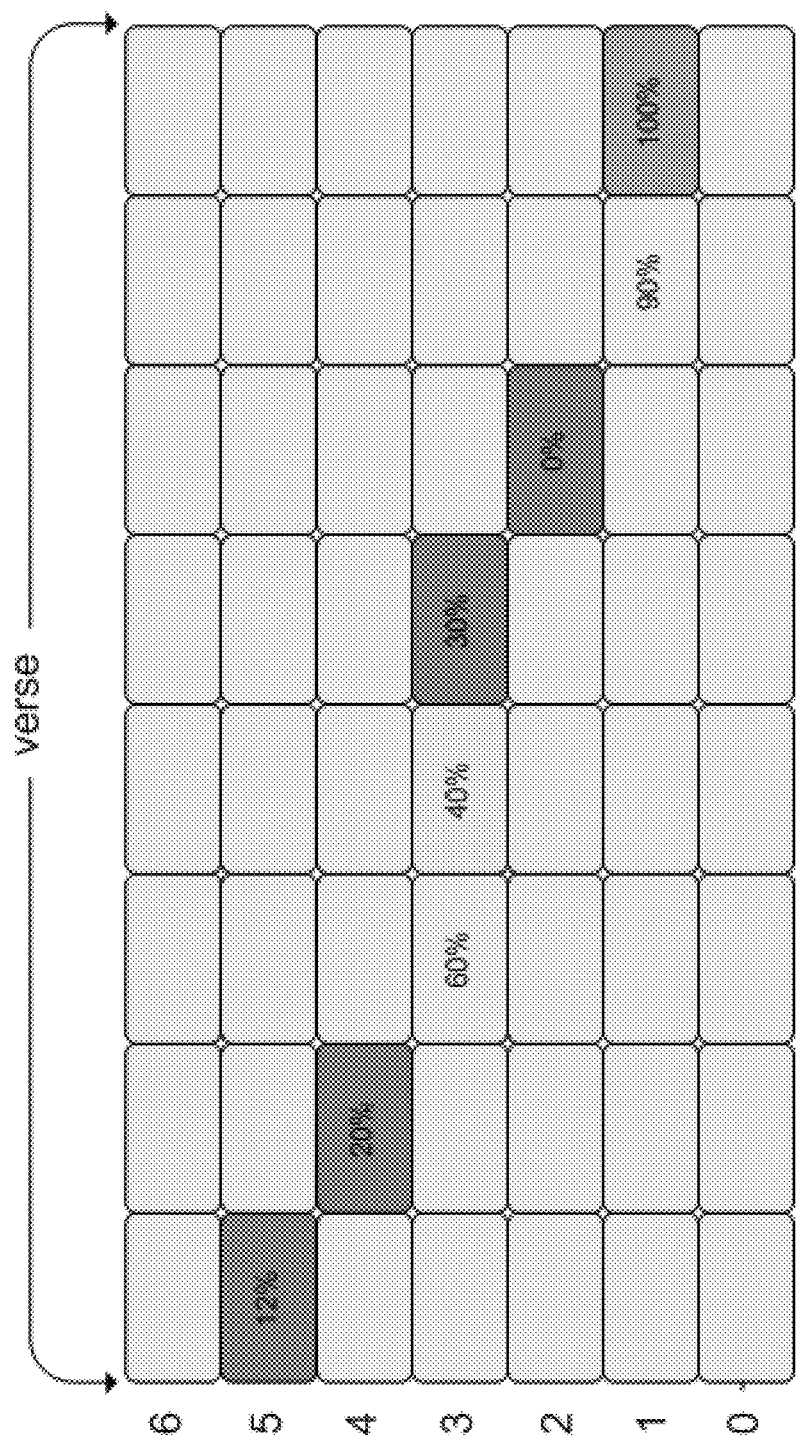
FIG. 29 illustrates a level down logic of the adaptive adjustment process.

FIG. 29 illustrates a level down logic of the adaptive adjustment process which is the process by which a player's difficulty for a particular phrase is reduced. During this process, if the player only gets X %-Y % (i.e., 25-49%) of the notes, the phrase is marked with a warning. If the player doesn't perform above M % (i.e., 50%) on the next instance of that phrase, then the player is dropped down a level for that phrase. If the player does perform above M % (i.e., 50%) on the next instance of that phrase, the warning marker is erased. The leveling down takes place on the next instance of that same phrase. If the player performs below X % (i.e., 25%) for a particular phrase, the game drops them down a level immediately. In the example shown in FIG. 29, the player scores below X % (i.e., 25%) and drops immediately, remains stable on level 3, but then starts to slip again so that to phrase is marked and after scoring below M % (i.e., 50%) a second time they are dropped down again.

Figure 30:
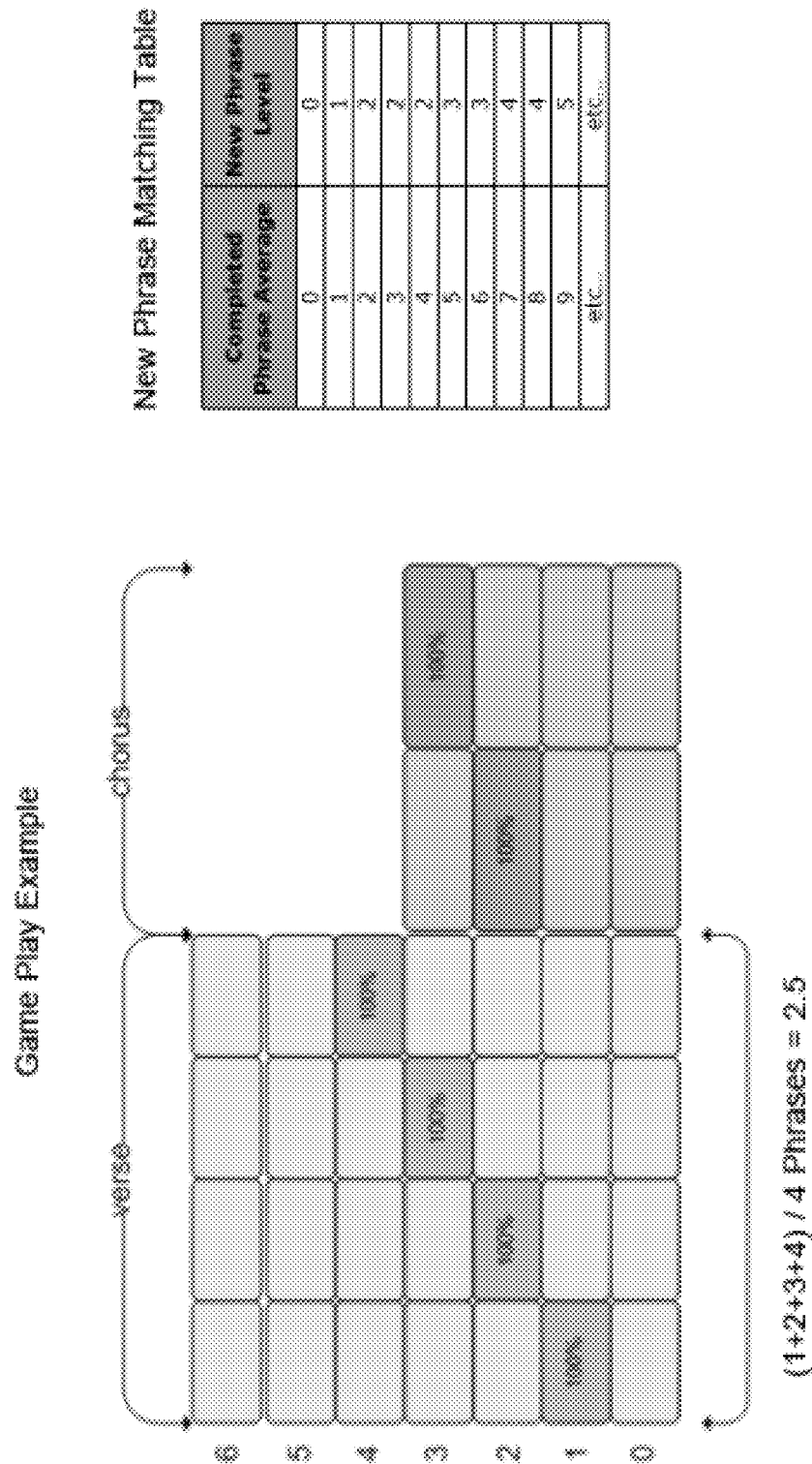
FIG. 30 illustrates a new phrase logic of the adaptive adjustment process.

FIG. 30 illustrates a new phrase logic of the adaptive adjustment process. The new Phrase Logic keeps the player from having to start back at level one every time they encounter a phrase they have never played before. When the game sees a new phrase, the adaptive adjustment process calculates its level based on the average of all previously completed phrases and references a matching table (an example of which is shown in FIG. 30) that indicates what level the new phrase should be presented. In the example in FIG. 30, the new phrase is the Chorus and the new phrase level of the chorus is calculated by taking average of the previously played phrases (the verse), rounding that number down, and referencing the new phrase matching table. In this example the New Phrase Logic has leveled the chorus to a level 2.

Figure 31:
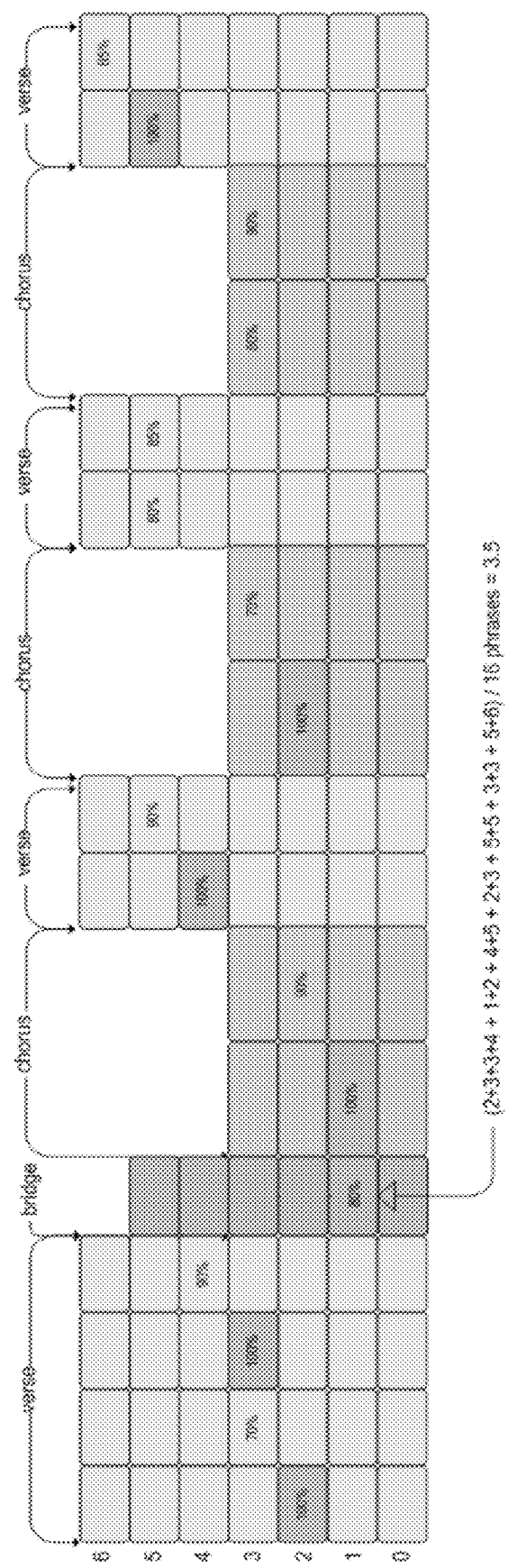
FIG. 31 illustrates disparity phrases that are handled by the adaptive adjustment process.

FIG. 31 illustrates disparity phrases that are handled by the adaptive adjustment process. Disparity is a markeplaced on a phrase when there are very few instances of the phrase. Similar to the new phrase logic, a disparity phrases level is calculated by taking the average of all previously completed phrases in a song and referencing a matching table. However, while the level for a New Phrase is only calculated once, the level for a Disparity Phrase is calculated every time. Once the player levels up a Disparity Phrase above the average calculated for it, the player's level is remembered instead. By constantly recalculating the average, the system has leveled out the disparity in leveling up infrequent phrases. In the example in FIG. 31, the average for all the phrases in the song are calculated, that result is rounded down, and the Disparity Matching Table is referenced to place the disparity phrase at a level 2.

FIG. 32 illustrates a persistent dynamic difficulty table that is part of the adaptive adjustment process. In the game, each player has a Persistent Dynamic Difficulty Table saved with their profile. The table tracks the number of repetitions a player must perform with 100% accuracy in order to level up a phrase from a given level and the table has a min and a max for each level as shown. The values for Min # of Repetitions and Max # of Repetitions should be in a easily modifiable array.

Figure 33:
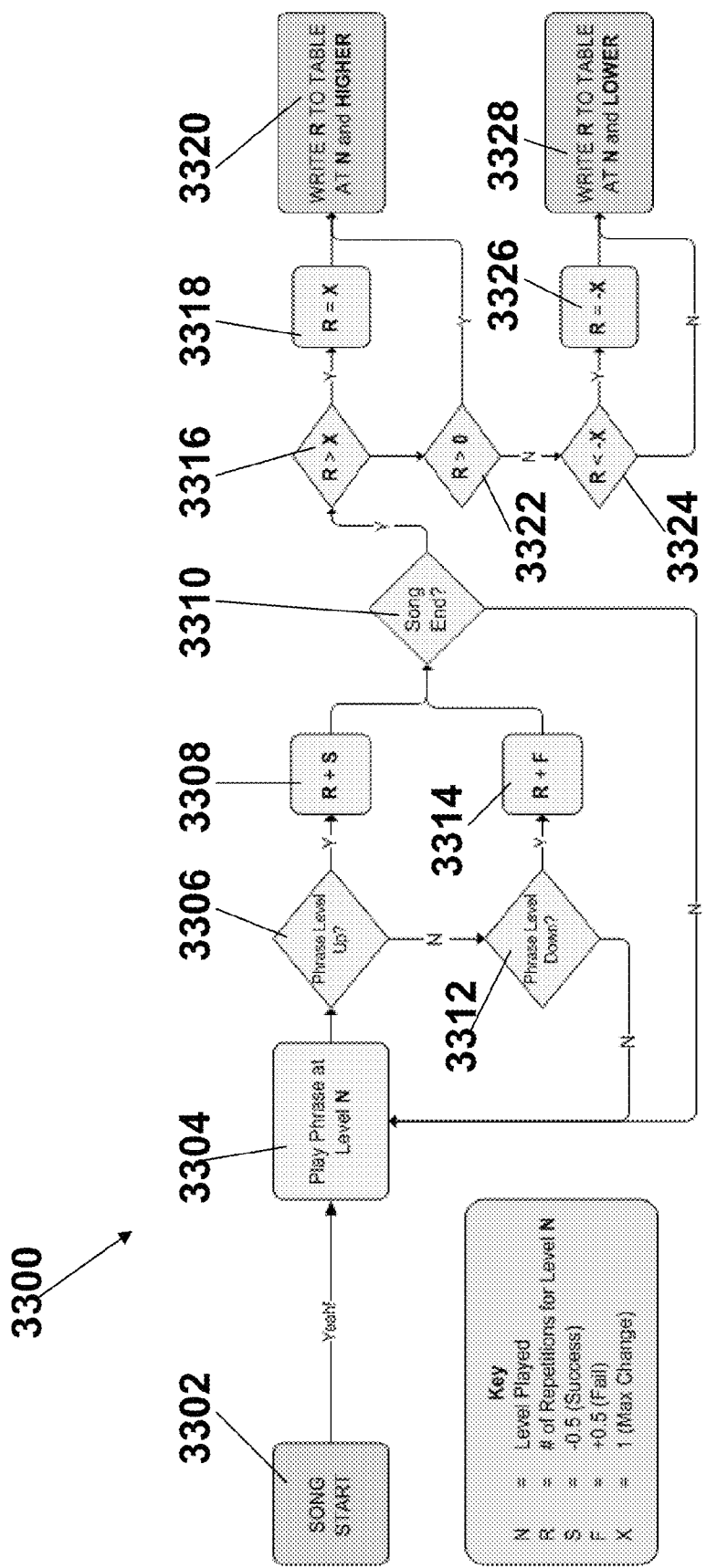
FIG. 33 illustrates a process for updating the dynamic difficulty table as part of the adaptive adjustment process.

FIG. 33 illustrates a process for updating 3300 the dynamic difficulty table as part of the adaptive adjustment process that occurs for each song and starts when a song starts (3302). When a song starts, the game plays a particular phrase at level N (3304) and then determines if the difficulty of the particular phrase should be leveled up (3306). If the player's skill at the particular phrase warrants a level up (see description above), then the process assigns a value of R+S (the number of repetitions of the particular phrase at level N and a success value) to the phrase (3308) and then determines if the song has ended (3310) and loops back to the next phrase (3304) if the song has not ended. If the player's skill at the particular phrase does not warrant a level up, then the process determines if the difficulty of the particular phrase should be leveled down (3312). If the player's skill at the particular phrase warrants a level down, then the process assigns a value of R+F (the number of repetitions of the particular phrase at level N and a failure value) to the phrase (3314) and then determines if the song has ended (3310) and loops back to the next phrase (3304) if the song has not ended. In this manner, each phrase of the song is completed and "scored".

When the song is completed, the process determines if the repetition value for each phrase is greater than a max change value (1 in this example) (3316). If the repetition value for each phrase is greater than a max change value, then the repetition value is changed to the max change value (3318) and the new value of R is written into the dynamic difficulty table for the particular phrase at level N and higher (3320). If the repetition value for each phrase is not greater than a max change value, the process determines if the repetition value for each phrase is greater than zero (3322). If the repetition value for each phrase is greater than zero, then the original value of R is written into the dynamic difficulty table for the particular phrase at level N and higher (3320). If the repetition value for each phrase is not greater than zero, then the process determines if the repetition value for each phrase is less than the negative max change value (3324). If the repetition value for each phrase is less than the negative max change value, then the repetition value is changed to the negative max change value (3326) and the new repetition value is written into the dynamic difficulty table for the particular phrase a level N and lower (3328). If the repetition value for each phrase is not less than the negative max change value, then the original value of the repetition value is written into the dynamic difficulty table for the particular phrase a level N and lower (3328). Using this process, the dynamic difficulty table for each phrase of each song is updated in the dynamic difficulty table, examples of which are shown in FIGS. 34A-C described below.

FIGS. 34A-C illustrate examples of a level up action result on a dynamic difficulty table, a level down action result on the dynamic difficulty table and a dynamic difficulty table at the end of a song, respectively. Leveling up a phrase modifies the required number of repetitions at that level and every level below while leveling down a phrase modifies the required number of repetitions at that level and every level above. While the table retains the float information, the required repetitions are rounded up. In addition, changes to the Persistent Dynamic Difficulty Table are recorded upon the completion of a song as shown in FIG. 33 above. In FIG. 34A, the player total level up (2×LUM) for level 2 gets propagated down the lower levels so that levels 0-2 are given a value of "1". In FIG. 34B, the player total level down (1×LDM) for level 4 gets propagated up the higher levels so that levels 4-6 have the same "2.5: value. FIG. 34C is an example of the table for a particular player at the end of a song.

Because the skills required by arrangement types vary, a player needs to have a separate persistent dynamic difficulty table for each arrangement type. Thus, for each player, there may be 3 persistent dynamic difficulty tables total, including: a Single Note/Lead; a combo and a Chord/Rhythm table.

Figure 35:
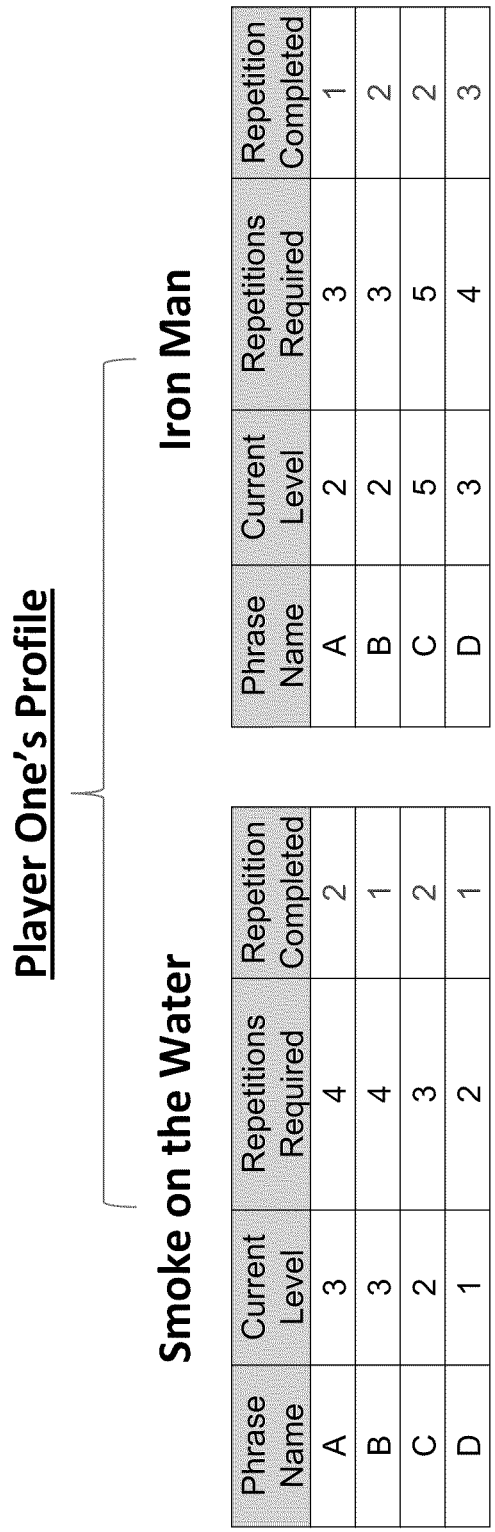
FIG. 35 illustrates a counting phrase repetitions that is part of the adaptive adjustment process.

FIG. 35 illustrates a counting phrase repetitions that is part of the adaptive adjustment process. In particular, successfully completed repetitions of a given phrase are saved per song with the players profile, but the repetitions completed counter resets after reaching required amount. In addition, the repetitions completed counter resets if the player levels down from a given phrase.

The adaptive adjustment process handles redundant levels which are levels in a phrase which are copies of the previous level. Redundant Levels are used to match the development of phrases when there are no options to build the density slow enough. In the normal/event mode of the game, the leveling up TO a redundant level should NOT trigger level up messaging and feedback and the leveling up FROM a redundant levels to a non-redundant levels should trigger all normal level up messaging. In the leveler mode of the game, the leveler should skip over redundant levels and display the next non-blank phrase.

The adaptive adjustment process also handles linked phrases which are phrases that have their difficulty level related to each other in a parent/child relationship and the linked phrases form a linked group. In these groups, there is one Parent Phrase, and one Child Phrases. When a Parent Phrase levels up, the Child Phrases<=to the Parent Phrase level up X amount. When a Parent Phrase levels down, all Child Phrases>=the parent level down Y amount. When a Child Phrase levels up or down, there is no change to the Parent Phrase or the other Child Phrases. The parent X & Y Variables are controlled on a group by group basis as editable properties from the editor tool.

The adaptive adjustment process also handles empty levels that are levels with no notes in them. Empty levels are often used in conjunction with Linked Phrases or Disparity to hold off the introduction of a phrase for the later levels. During the normal/event mode of the game, empty levels should NOT automatically level up and empty Levels should only be leveled up through Linked or Disparity relationships. In a play next mode of the game, play next should not recommend practicing a phrase level that is an empty level. In the leveler mode of the game, the user should NOT be able to manually select sections for the Leveler that are empty. In the accelerator mode, the user should NOT be able to manually select sections for Accelerator that are empty.

The adaptive adjustment process also handles ignore phrases that are flagged phrases that do not advance or demote the dynamic difficulty. (i.e., playing an Ignore Phrase perfectly won't level up the phrase) They are usually instances of a phrase that are not the complete phrase for design reasons. In the play next mode of the game, the play next mode should NOT recommend challenges that uses ignore phrases and instead recommend a more common instance of the same phrase.

The adaptive adjustment process also handles level jumps which are flags on levels of a phrase that halt the advancement of the dynamic difficulty. In the game, there can be more than one Level Jump per phrase. The level jump stops the advancement of the dynamic difficulty at the level before the phrase that is marked. (i.e., if the 8th level of an A phrase is a level jump, than the player can not advance past the 7th level.)

Each level jump has a challenge (level jump challenge) to unlock the level jump. The level jump challenges are a combination of the Free Speed and Accelerator challenges and players need to complete the level jump challenges in order to unlock Level Jumps in Normal Mode. In the game, there are two ways to unlock a level jump challenge: 1) leveling up to the Level Jump from Normal Mode; and 2) leveling up to the Level Jump from Leveler. The player must complete the Level Jump Challenge above X % in order to unlock the Level Jump in Normal Mode. Once the player completes the Level Jump Challenge, the Level Jump disappears. In the normal game play mode, all notes of a Level Jump and notes of levels past a Level Jump are counted as bonus points, the messaging indicates that a Level Jump Challenge has been unlocked and level jumps need to be removed once completed. In the leveler mode of the game, level jump challenges are unlockable from Leveler, but not playable in Leveler and the messaging to indicate that a Level Jump Challenge has been unlocked.

Multilayer Timing

The instrument game system may also have, in certain embodiments, multi-layer timing (that contributes to an anticipatory display). The multilayered timing information is a method of providing more than one indicator for conveying the timing information to the end user in the user interface of the game. The multi-layer timing may include spatial timing, rotational timing and container growth timing that are described below in more detail.

Figure 36:
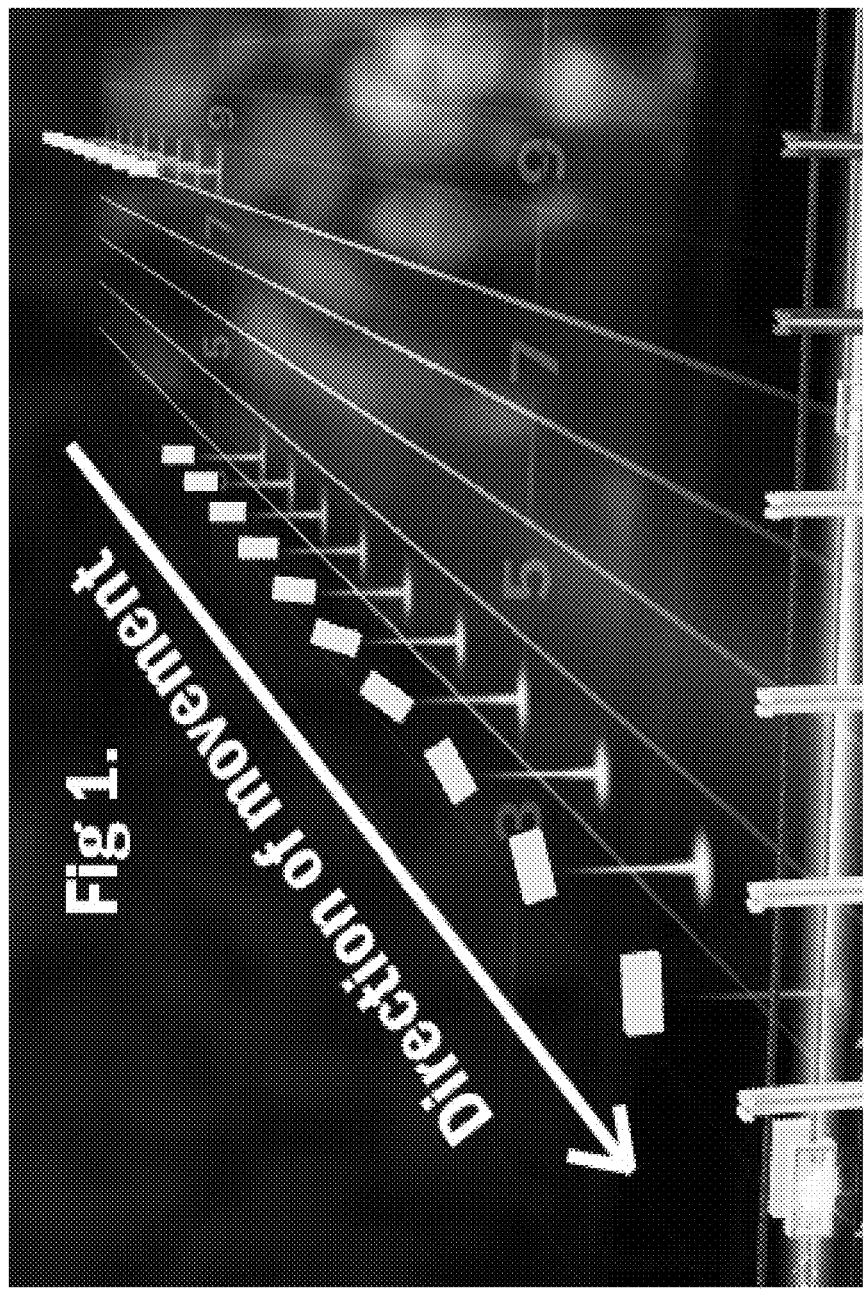
FIG. 36 illustrates spatial timing that is part of the game.

FIG. 36 illustrates spatial timing that is part of the game. In particular, as the notes come down the noteway. the distance from the fingerboard and the speed at which the note approaches the fingerboard conveys the amount of time before the notes needs to be struck.

Figure 37:
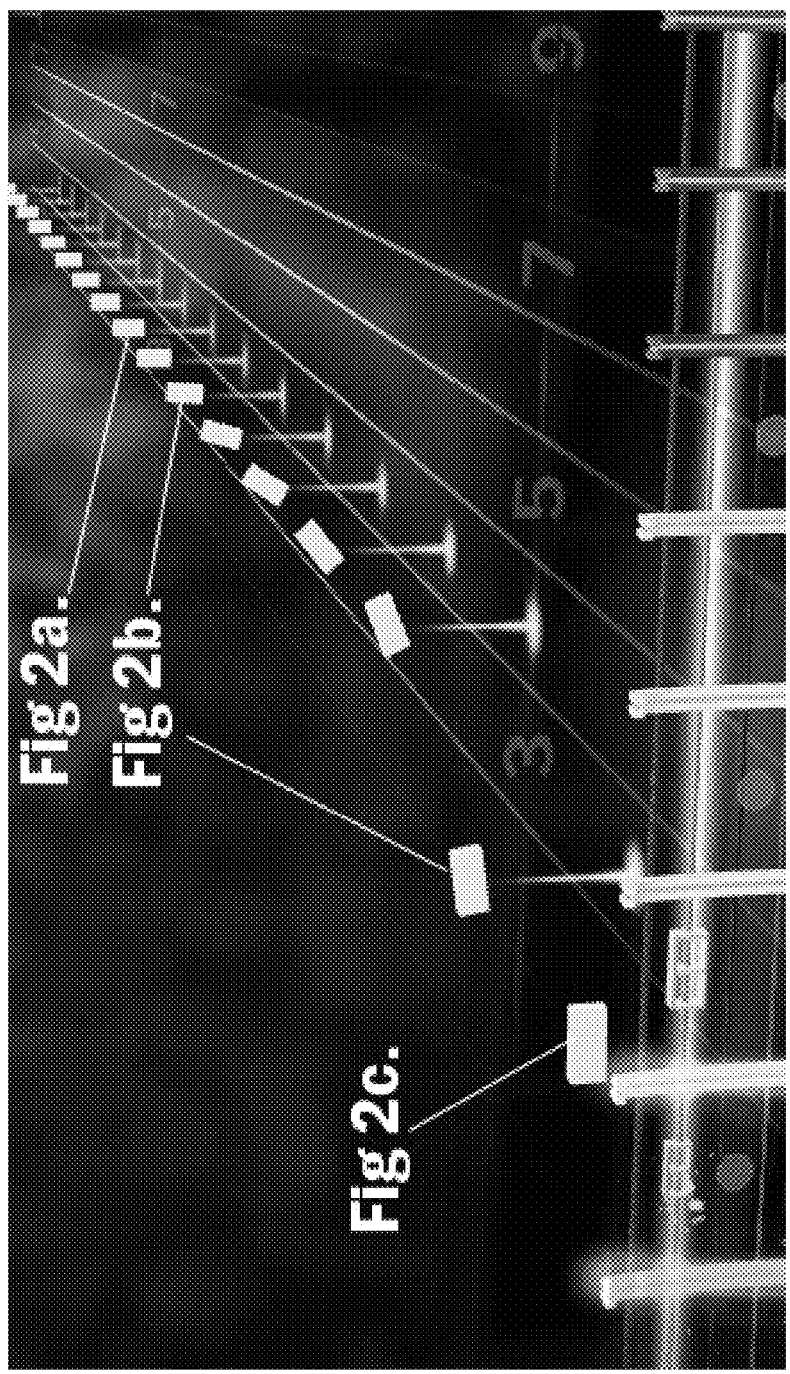
FIG. 37 illustrates rotational timing that is part of the game.

FIG. 37 illustrates rotational timing that is part of the game. In particular, as the notes come down the noteway, the notes rotate 90 degrees to line up with the "containers" (described above) that appear on the fingerboard. This rotation begins a measure before the note lines up with the fingerboard, providing a secondary timing for the note. In FIG. 37, a default state (FIG. 2a.) is shown with the note rectangle being vertical. One measure away from the fingerboard (and one measure before the exact moment the note needs to be played), the note being to rotate (FIG. 2b.). In the moment just before the note is to be played, the note has almost fully rotated (FIG. 2c.).

Figure 38:
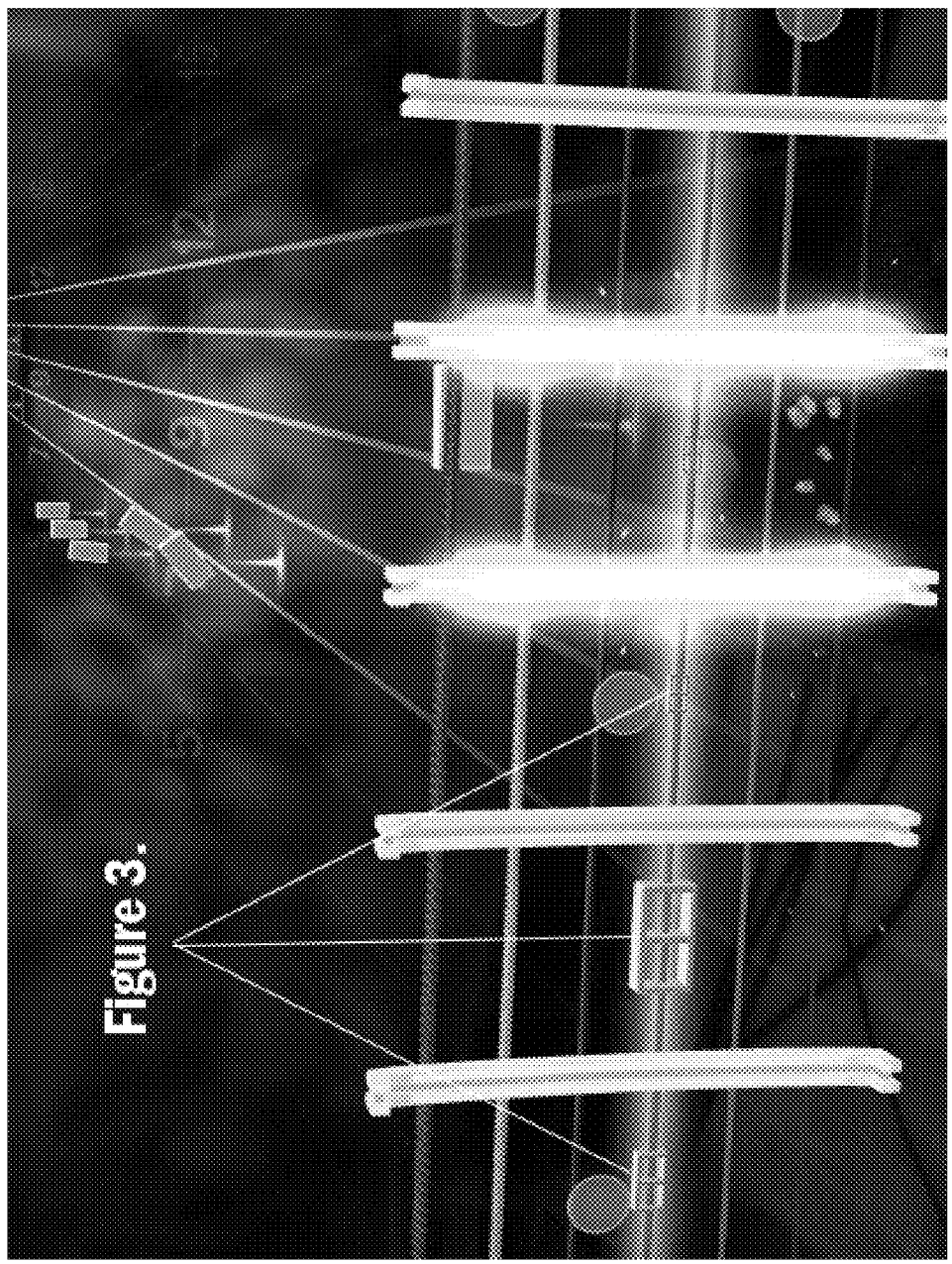
FIG. 38 illustrates container growth timing that is part of the game.

FIG. 38 illustrates container growth timing that is part of the game. In particular, the container that is on the fingerboard starts off small, and gradually grows as the note gets closer. The container will grow to its maximum size a measure before the note lands on the fingerboard.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A non-transitory computer readable storage medium having a computer program stored thereon for instructing a user on playing a musical instrument, wherein the computer program instructs a processing element to perform the following steps:

presents, on an electronic display, a graphical representation of a plurality of notes or chords of a song to be played on the musical instrument and by the user during a session, wherein the session corresponds to a single playing of the song, wherein each said note or chord is associated with a predetermined data file for the note or chord;

divide the song into a plurality of phrases, wherein each phrase includes at least one of said plurality of notes or chords;

assign at least a first difficulty level and at least a second difficulty level to each phrase;

advance, on the electronic display, the graphical representation of said plurality of notes or chords to present each of the plurality of phrases of the song so as to instruct playing, on the musical instrument and by the user, the song, wherein at least one of said plurality of phrases is presented on the electronic display at said first difficulty level;

receive an output corresponding to an electronic signal for each of said plurality of notes or chords produced by the musical instrument as played by the user;

compare the received output against said predetermined data file for each of said plurality of notes or chords produced by the musical instrument as played by the user;

for each phrase including at least one note or chord of said plurality of notes or chords, determine an accuracy of play, by the user, of the phrase, wherein the accuracy of play is at least in part based on said step of comparing the received output against said predetermined data file, wherein the accuracy of play is determined in real time as the user plays the at least one note or chord of each phrase of the song during the session; and upon the accuracy of play being above a predetermined threshold for said at least one of said plurality of phrases, automatically adjust the advanced graphical representation of the presented at least one of said plurality of phrases from the first difficulty level to the second difficulty level, wherein the automatic adjustment of the presented at least one of said plurality of phrases from the first difficulty level to the second difficulty level is performed during the session.

2. The computer readable storage medium of claim 1, wherein the first difficulty level is an initial difficulty level that represents a simplest abbreviation of a phrase.

3. The computer readable storage medium of claim 1, wherein the first difficulty level is based on an average difficulty level of all successfully completed phrases previously played by the user in the single session of the song.

4. The computer readable storage medium of claim 1, wherein the first difficulty level is based on a difficulty level attained by the user during a previous playing of the song in a prior session.

5. The computer readable storage medium of claim 1, wherein the first and second difficulty levels are based on a skill level of the user.

6. The computer readable storage medium of claim 1, wherein each of said plurality of phrases further includes a third difficulty level for the phrase that can be presented during the session.

7. The computer readable storage medium of claim 1, wherein the predetermined data file for each said note or chord includes note tag information and tag time information.

8. The computer readable storage medium of claim 1, wherein the session begins when the graphical representation of said plurality of notes or chords of the song is presented on the electronic display, and wherein the session ends when the advancement of the plurality of notes or chords of the song on the electronic display is completed.

9. A method for instructing a user on playing a musical instrument comprising the steps of:

presenting, by at least one processing element and on an electronic display, a graphical representation of a plurality of notes or chords of a song to be played on the musical instrument and by the user during a session, wherein the session corresponds to a single playing of the song, wherein each said note or chord is associated with a predetermined data file for the note or chord;

dividing, by at least one processing element, the song into a plurality of phrases, wherein each phrase includes at least one of said plurality of notes or chords;

assigning, by at least one processing element, at least a first difficulty level and at least a second difficulty level to each phrase;

advancing, by at least one processing element and on the electronic display, the graphical representation of said plurality of notes or chords to present each of the plurality of phrases of the song so as to instruct playing, on the musical instrument and by the user, the song, wherein at least one of said plurality of phrases is presented on the electronic display at said first difficulty level;

receiving, by at least one processing element, an output corresponding to an electronic signal for each of said plurality of notes or chords produced by the musical instrument as played by the user;

comparing, by at least one processing element, the received output against said predetermined data file for each of said plurality of notes or chords produced by the musical instrument as played by the user;

for each phrase including at least one note or chord of said plurality of notes or chords, determining, by at least one processing element, an accuracy of play, by the user, of the phrase, wherein the accuracy of play is at least in part based on said step of comparing the received output against said predetermined data file, wherein the accuracy of play is determined in real time as the user plays the at least one note or chord of each phrase of the song during the session; and upon the accuracy of play being above a predetermined threshold for said at least one of said plurality of phrases, automatically adjusting, by at least one processing element, the advanced graphical representation of the presented at least one of said plurality of phrases from the first difficulty level to the second difficulty level, wherein the automatic adjustment of the presented at least one of said plurality of phrases from the first difficulty level to the second difficulty level is performed during the session.

10. The method of claim 9, wherein the first difficulty level is an initial difficulty level that represents a simplest abbreviation of a phrase.

11. The method of claim 9, wherein the first difficulty level is based on an average difficulty level of all successfully completed phrases previously played by the user in the single session of the song.

12. The method of claim 9, wherein the first difficulty level is based on a difficulty level attained by the user during a previous playing of the song in a prior session.

13. The method of claim 9, wherein the first and second difficulty levels are based on a skill level of the user.

14. The method of claim 9, wherein each of said plurality of phrases further includes a third difficulty level for the phrase that can be presented during the session.

15. The method of claim 9, wherein the predetermined data file for each said note or chord includes note tag information and tag time information.

16. The method of claim 9,
wherein the session begins when the graphical representation of said plurality of notes or chords of the song is presented on the electronic display, and
wherein the session ends when the advancement of the plurality of notes or chords of the song on the electronic display is completed.

17. A system for instructing a user on playing a musical instrument comprising:
a processing element; and
a memory element associated with a non-transitory computer readable storage medium,
wherein the non-transitory computer readable storage medium has a computer program stored thereon,
wherein the computer program instructs the processing element to perform the following steps:
present, on an electronic display, a graphical representation of a plurality of notes or chords of a song to be played on the musical instrument and by the user during a session,
wherein the session corresponds to a single playing of the song,
wherein each said note or chord is associated with a predetermined data file for the note or chord;
divide the song into a plurality of phrases, wherein each phrase includes at least one of said plurality of notes or chords;
assign at least a first difficulty level and at least a second difficulty level to each phrase;
advance, on the electronic display, the graphical representation of said plurality of notes or chords to present each of the plurality of phrases of the song so as to instruct playing, on the musical instrument and by the user, the song,
wherein at least one of said plurality of phrases is presented on the electronic display at said first difficulty level;
receive an output corresponding to an electronic signal for each of said plurality of notes or chords produced by the musical instrument as played by the user;
compare the received output against said predetermined data file for each of said plurality of notes or chords produced by the musical instrument as played by the user;
for each phrase including at least one note or chord of said plurality of notes or chords, determine an accuracy of play, by the user, of the phrase,
wherein the accuracy of play is at least in part based on said step of comparing the received output against said predetermined data file,
wherein the accuracy of play is determined in real time as the user plays the at least one note or chord of each phrase of the song during the session; and
upon the accuracy of play being above a predetermined threshold for said at least one of said plurality of phrases, automatically adjust the advanced graphical representation of the presented at least one of said plurality of phrases from the first difficulty level to the second difficulty level,
wherein the automatic adjustment of the presented at least one of said plurality of phrases from the first difficulty level to the second difficulty level is performed during the session.

18. The system of claim 17, wherein the first difficulty level is selected from the group consisting of (1) an initial difficulty level that represents a simplest abbreviation of a phrase; (2) an average difficulty level of all successfully completed phrases previously played by the user in the single session of the song; and (3) a difficulty level attained by the user during a previous playing of the song in a prior session.

19. The system of claim 17, wherein the predetermined data file for each said note or chord includes note tag information and tag time information.

20. The system of claim 17,
wherein the session begins when the graphical representation of said plurality of notes or chords of the song is presented on the electronic display, and
wherein the session ends when the advancement of the plurality of notes or chords of the song on the electronic display is completed.

* * * * *